(12) United States Patent
Kokubo

(10) Patent No.: US 7,559,613 B2
(45) Date of Patent: Jul. 14, 2009

(54) AUTOMATIC BRAKE CONTROL UNIT

(75) Inventor: Koichi Kokubo, Kariya (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 156 days.

(21) Appl. No.: 11/268,485

(22) Filed: Nov. 8, 2005

(65) Prior Publication Data

US 2006/0119173 A1     Jun. 8, 2006

(30) Foreign Application Priority Data

Dec. 2, 2004    (JP) .............................. 2004-350159

(51) Int. Cl.
*B60T 7/12* (2006.01)
(52) U.S. Cl. .............................. 303/16; 303/3; 303/155
(58) Field of Classification Search ... 303/113.1–113.5, 303/116.1, 116.2, 10, 11, 3, 15, 16
See application file for complete search history.

(56) References Cited

U.S. PATENT DOCUMENTS

| | | | |
|---|---|---|---|
| 5,941,608 A * | 8/1999 | Campau et al. .......... | 303/113.4 |
| 6,290,310 B1 * | 9/2001 | Kusano .................... | 303/113.4 |
| 6,460,944 B2 * | 10/2002 | Isono et al. ................ | 303/159 |
| 6,543,859 B2 * | 4/2003 | Sakamoto ................ | 303/113.2 |
| 6,733,090 B2 * | 5/2004 | Pasterkamp et al. ...... | 303/113.4 |
| 7,244,002 B2 * | 7/2007 | Tsunehara ............... | 303/113.1 |

FOREIGN PATENT DOCUMENTS

JP     2004-009914 A     1/2004

* cited by examiner

*Primary Examiner*—Melanie Torres
(74) *Attorney, Agent, or Firm*—Buchanan Ingersoll & Rooney PC

(57) ABSTRACT

The automatic brake control unit can be applied to an automatic braking device including a reservoir that can suck a brake fluid discharged from a master cylinder, and a cut valve that can permit or prohibit the introduction of the brake fluid into the reservoir. The unit opens the cut valve during automatic brake control. Thus, the brake fluid discharged from the master cylinder according to a brake-pedal stroke is sucked into the reservoir by the maximum capacity of the reservoir during a brake override. Consequently, the relationship between the brake-pedal stroke and the wheel-cylinder pressure during the brake override can be brought close to that for the case where automatic brake control is not in operation.

7 Claims, 14 Drawing Sheets

AUTOMATIC BRAKE CONTROL UNIT

BACKGROUND OF THE INVENTION

1. Field of the Invention

The present invention relates to an automatic brake control unit for controlling an automatic braking device.

2. Description of the Related Art

Conventionally, it is known in the art to provide an automatic braking device that automatically controls the hydraulic pressure of a wheel cylinder independently of the operation of a brake operating member such as a brake pedal by a driver. For example, an automatic braking device described in Japanese Unexamined Patent Application Publication No. 2004-9914 includes a hydraulic pump that can generate pressurization for generating a wheel-cylinder pressure higher than that of a master cylinder that is generated by the operation of the brake operating member, and a normally open linear solenoid valve that can control the pressure applied to master-cylinder pressure using the pressurization by the hydraulic pump independently of the operation of a brake operating member by a driver.

The unit detects the distance between a vehicle equipped with this system and the preceding vehicle, wherein when the detected distance is smaller than a specified reference value, it controls the hydraulic pump and the normally open linear solenoid valve. The unit executes automatic brake control to automatically control a wheel-cylinder pressure using "hydraulic pressure obtained by the addition of the pressurization to the master-cylinder pressure", thereby automatically applying braking force to the vehicle independently of the operation of a brake operating member by a driver.

In general vehicles, when the driver operates a brake pedal when the automatic brake control is not in operation (hereinafter, this is also referred to as a normal brake operation), the relationship between the stroke of the brake pedal and the wheel-cylinder pressure is indicated by the solid line in FIG. 14. In other words, in the initial stage in which the brake-pedal stroke comes from "0" to a certain value S0, the wheel-cylinder pressure hardly increases even when the brake-pedal stroke increases. Accordingly, a wheel-cylinder pressure that can contribute to the braking of the vehicle cannot be substantially generated in the initial stage.

This is because, in the initial stage, when the wheel-cylinder pressure is "0", a brake pad moves from a position where it is not in contact with a corresponding brake disc to a position where it is in contact with the brake disc (a position where it can push the brake disc) according to the brake-pedal stroke. That is, most of the brake fluid discharged from the master cylinder according to the brake-pedal stroke is consumed to move the piston in the wheel cylinder with the movement of the brake pad.

Hereinafter, a brake-fluid volume corresponding to the moving distance of the piston in the wheel cylinder with the movement of the brake pad is referred to as "an invalid fluid volume", and a brake-pedal stroke (the above-mentioned value S0) corresponding to the time that all the invalid fluid volume is discharged from the master cylinder (i.e., the time that a wheel-cylinder pressure that can contribute to the braking of the vehicle substantially starts to be generated) is also referred to as "an invalid stroke".

In the stage in which the brake-pedal stroke has exceeded the invalid stroke S0, the brake pad is in contact with the brake disc. In this state, the wheel-cylinder pressure that can virtually contribute to the braking of the vehicle increases at a relatively large increase gradient with an increasing in brake-pedal stroke. The increase characteristic of the wheel-cylinder pressure in this stage mainly depends on the operation characteristic of a booster (e.g., a vacuum booster) interposed between the brake pedal and the master cylinder, the elasticity characteristic of the wheel cylinder, the elasticity characteristic of the brake pipe arrangement, and the elasticity characteristic of the brake pad.

Consider the case where a driver starts the operation of the brake pedal in a state in which the foregoing automatic brake control has already been executed, and the wheel-cylinder pressure is maintained at a value at which it can virtually contribute to the braking of the vehicle. Hereinafter, such an operation is also referred to as "a brake override".

When the brake override is executed, the above-described invalid fluid volume is not consumed to move the piston in the wheel cylinder because the brake-pedal stroke has already been in contact with the brake disc from the state of "0". Hereinafter, an example will be described in which the amount of pressurization is maintained at value P0 by the automatic brake control, and as a result, the wheel-cylinder pressure is at value P0 at the time of starting a brake-pedal operation (the time of starting a brake override).

In this case, the increase characteristic of the wheel-cylinder pressure corresponding to an increase from the brake-pedal stroke "0" agrees with the increase characteristic of the wheel-cylinder pressure (refer to the part upper than the point z of the solid line in FIG. 14) corresponding to an increase from the value Sz of the brake-pedal stroke in a normal brake operation (refer to FIG. 14).

In other words, the relationship (static relationship) between the brake-pedal stroke and the wheel-cylinder pressure in this case is indicated by the line obtained by translating the part of the solid line in FIG. 14 corresponding to the value P0 of the wheel-cylinder pressure (the part upper than the point z in FIG. 14) to the left in FIG. 14 by the length corresponding to the brake-pedal stroke Sz.

Thus, the relationship between the brake-pedal stroke and the wheel-cylinder pressure varies greatly between that of a normal brake operation (the solid line in FIG. 14) and that of a brake override (the broken line in FIG. 14). More specifically, in the case of the brake override, the wheel-cylinder pressure relative to the same brake-pedal stroke (accordingly, a braking force applied to the vehicle) is significantly higher than that of the normal brake operation.

Thus, the brake feeling of the driver varies greatly between that of the brake override and that of the normal brake operation, posing the problem of generating a brake feeling of significant wrongness during the brake override.

SUMMARY OF THE INVENTION

The present invention has been made to solve the above-described problems. Accordingly, it is an object of the invention to provide an automatic brake control unit capable of providing a brake feeling with little wrongness during a brake override.

An automatic brake control unit according to an aspect of the invention is applied to an automatic braking device including: a pressurizing section that can generate pressurizing hydraulic pressure for generating a wheel-cylinder pressure higher than a master-cylinder pressure that is generated according to the operation of a brake operating member by a driver independently of the operation of the brake operating member; a pressure-control section that can control the amount of pressurization applied to the master-cylinder pressure using the pressurizing hydraulic pressure generated by the pressurizing section; and an automatic brake control section that executes automatic brake control for automatically controlling the wheel-cylinder pressure independently of the operation of the brake operating member by the driver, using a hydraulic pressure obtained by adding the amount of the pressurization to the master-cylinder pressure and generated by controlling the pressurizing section and the pressure-control section.

The automatic brake control unit according to the invention is characterized by including a specific-operation executing section that executes a specific operation for bringing the relationship between the operation stroke of the brake operating member by the driver and the wheel-cylinder pressure when the automatic brake control is executed by the automatic brake control section to the relationship between the operation stroke of the brake operating member by the driver and the wheel-cylinder pressure when the automatic brake control is not executed.

With such a structure, the relationship between the operation stroke of the brake operating member by the driver and the wheel-cylinder pressure when the automatic brake control is in operation (i.e., the static relationship for the case where a brake override is executed) can be brought close to the relationship between the operation stroke of the brake operating member and the wheel-cylinder pressure for the case where the automatic brake control is not executed (i.e., the relationship for a normal brake operation).

Consequently, the brake feeling in the case where a brake override is executed can be close to that of a normal brake operation, so that a brake feeling with little wrongness can be provided during the brake override.

More specifically, it is preferable that the automatic braking device incorporating the automatic brake control unit according to an aspect of the invention further include a reservoir that can suck a brake fluid discharged from a master cylinder and having the master-cylinder pressure; and an solenoid valve that can permit or prohibit the introduction of the brake fluid having the master-cylinder pressure into the reservoir; and the specific-operation executing section control the solenoid valve so that, when the automatic brake control is not executed, the introduction of the brake fluid having the master-cylinder pressure into the reservoir is prohibited; and when the automatic brake control is executed, the introduction of the brake fluid into the reservoir is permitted as the specific operation.

Here, the "solenoid valve" is, e.g., a normally closed electromagnetic switch valve, but is not limited to that. It is preferable that the maximum amount of brake fluid that the "reservoir" can suck be set to an amount equal to the above-described invalid hydraulic pressure.

With such a structure, when the operation of the brake operating member by the driver is started during the execution of the automatic brake control (i.e., when the brake override is started), a brake fluid discharged from the master cylinder and having a master-cylinder pressure can be sucked into the reservoir according to such operation (an operation stroke). Briefly, a brake fluid corresponding to the maximum capacity of the reservoir can be consumed not to increase the wheel-cylinder pressure but to move into the reservoir.

This indicates that, in the case of the example indicated by the broken line of FIG. 14 (i.e., in the case where the amount of pressurization is maintained at a value P0 by the automatic brake control, so that the wheel-cylinder pressure indicates a value P0 at the time the brake-pedal stroke is "0" (at the time the brake override is started)), the static relationship between the brake-pedal stroke and the wheel-cylinder pressure becomes (close to) the relationship indicated by the line obtained by translating the broken line in FIG. 14 to the right in FIG. 14 by a brake-pedal stroke corresponding to the maximum capacity of the reservoir.

Consequently, the static relationship between the brake-pedal stroke and the wheel-cylinder pressure for the case where the brake override is executed can be brought close to the relationship indicated by the solid line of FIG. 14 (i.e., the relationship for the case where a normal brake operation is executed). Thus, the brake feeling during the brake override can be brought close to that of a normal brake operation.

It is preferable that the reservoir include a hydraulic-pressure control mechanism that increases the brake pressure in the reservoir with an increase in the amount of the brake fluid sucked into the reservoir. With such a structure, when the brake override is being executed, the master-cylinder pressure (accordingly, the wheel-cylinder pressure) can be increased at an any increasing gradient in the initial stage in which the operation stroke of the brake operating member reaches from "0" to the maximum capacity of the reservoir.

As can be understood from the solid line of FIG. 14, also with a normal brake operation, the wheel-cylinder pressure increases gradually within the range of not contributing to the braking of the vehicle in the initial stage in which the operation stroke of the brake operating member reaches from "0" to the invalid stroke.

Thus, providing the reservoir with the hydraulic-pressure control mechanism allows the increase gradient of the wheel-cylinder pressure in the initial stage when the brake override is executed can be brought close to that for a normal brake operation. Thus, the brake feeling during the brake override can be brought close to that of a normal brake operation.

The hydraulic-pressure control mechanism may be constructed using the elastic force of an elastic member that receives a force corresponding to the brake pressure in the reservoir.

The automatic brake control unit for use in the automatic braking device including the reservoir and the solenoid valve may include a two-system brake hydraulic circuit, the two systems each having the reservoir and the solenoid valve. In this case it is preferable that when the automatic brake control is not in operation, the specific-operation executing section controls the solenoid valves of the two systems individually so as to prohibit the introduction of the brake fluid having the master-cylinder pressure into the corresponding reservoir; and when the automatic brake control is in operation, the specific-operation executing section always controls one of the solenoid valves so as to permit the introduction of the brake fluid having the master-cylinder pressure into the corresponding reservoir and controls the other of the solenoid valves so as to permit the introduction of the brake fluid into the corresponding reservoir only in the case where the wheel-cylinder pressure at the start of the operation of the brake operating member by the driver has exceeded a specified pressure higher than the atmospheric pressure.

Consider the case of controlling the two systems of solenoid valves individually so as to always permit the introduction of the brake fluid having the master-cylinder pressure into the corresponding reservoir during the execution of the automatic brake control after the start of the automatic brake control. Assume the case where the wheel-cylinder pressure at the start of the operation of the brake operating member by the driver (i.e., the amount of pressurization at the start of a brake override, which corresponds to the value P0 in FIG. 14) is relatively low, and the sum of the maximum capacities of the two systems of reservoirs is relatively large when the automatic brake control is being executed.

This can cause the wheel-cylinder pressure relative to the brake-pedal stroke to be lower than that for the normal brake operation, indicated by the solid line of FIG. 14. In other words, the line that indicates the relationship between the brake-pedal stroke and the wheel-cylinder pressure (corresponding to the broken line of FIG. 14) can be shifted to a lower position (or to the right) in FIG. 14 relative to the solid line of FIG. 14.

The situation that the wheel-cylinder pressure relative to the brake-pedal stroke becomes lower than that for a normal brake operation is not preferable because it prevents the driver from obtaining a desired braking force, thus generating a driving feeling of significant wrongness.

Accordingly, when the wheel-cylinder pressure at the start of the brake override is relatively low, it is not preferable to control the two systems of solenoid valves so as to permit the introduction of the brake fluid into the corresponding reservoir.

In contrast, when the other solenoid valve is controlled so as to permit the introduction of the brake fluid into the corresponding reservoir only when the wheel-cylinder pressure at the start of the brake override has become equal to or higher than a specified pressure that is higher than the atmospheric pressure, the introduction of the brake fluid only into a reservoir corresponding the first solenoid valve when the wheel-cylinder pressure at the start of the brake override is smaller than the specified pressure.

Thus, when the wheel-cylinder pressure at the start of the brake override is smaller than the specified pressure, the wheel-cylinder pressure relative to the brake-pedal stroke can be higher than that for the case where the introduction of the brake fluid into the two systems of reservoirs is permitted. This can therefore prevent the situation that the wheel-cylinder pressure relative to the brake-pedal stroke becomes lower than that for a normal brake operation, thus preventing the generation of a driving feeling of significant wrongness.

It is preferable that the automatic braking device incorporating the automatic brake control unit according to an aspect of the invention further include: a pressure-reducing valve for controlling the wheel-cylinder pressure to a pressure lower than that obtained by adding the amount of pressurization to the master-cylinder pressure; a stroke obtaining section that obtains the operation stroke of the brake operating member by the driver; and a target determination section that determines the target of the relationship between the operation stroke of the brake operating member by the driver and the wheel-cylinder pressure when the automatic brake control is in operation on the basis of at least the relationship between the operation stroke of the brake operating member and the wheel-cylinder pressure when the automatic brake control is not in operation; and when the automatic brake control is in operation and the brake operating member is in operation by the driver, the specific-operation executing section determine the target value of the wheel-cylinder pressure from the obtained operation stroke and the determined target relationship, and controls the pressure-reducing valve, as the specific operation, so that the wheel-cylinder pressure agrees with the target value.

With such a structure, when a brake override is in operation, the target of the relationship between the operation stroke of the brake operating member by the driver and the wheel-cylinder pressure (i.e., the relationship indicated by the solid line of FIG. 14) is determined on the basis of at least the relationship between the operation stroke of the brake operating member and the wheel-cylinder pressure when the automatic brake control is not in operation. The pressure-reducing valve is controlled so that the relationship between the operation stroke of the brake operating member and the wheel-cylinder pressure when the brake override is in operation agrees with the target relationship.

Thus, the static relationship between the brake-pedal stroke and the wheel-cylinder pressure when the brake override is in operation can be brought close to the relationship indicated by the solid line of FIG. 14 (i.e., the relationship for the normal brake operation). Hence, the brake feeling during the brake override can be close to that of the normal brake operation even with the pressure-reducing valve in place of the reservoir and the solenoid valve.

As the pressure-reducing valve, a pressure-reducing valve for controlling a wheel-cylinder pressure, which is used in known automatic braking devices, can be used. Accordingly, the known automatic braking devices can be applied to the automatic brake control unit according to the invention.

DESCRIPTION OF THE PREFERRED EMBODIMENTS

Figure 1:
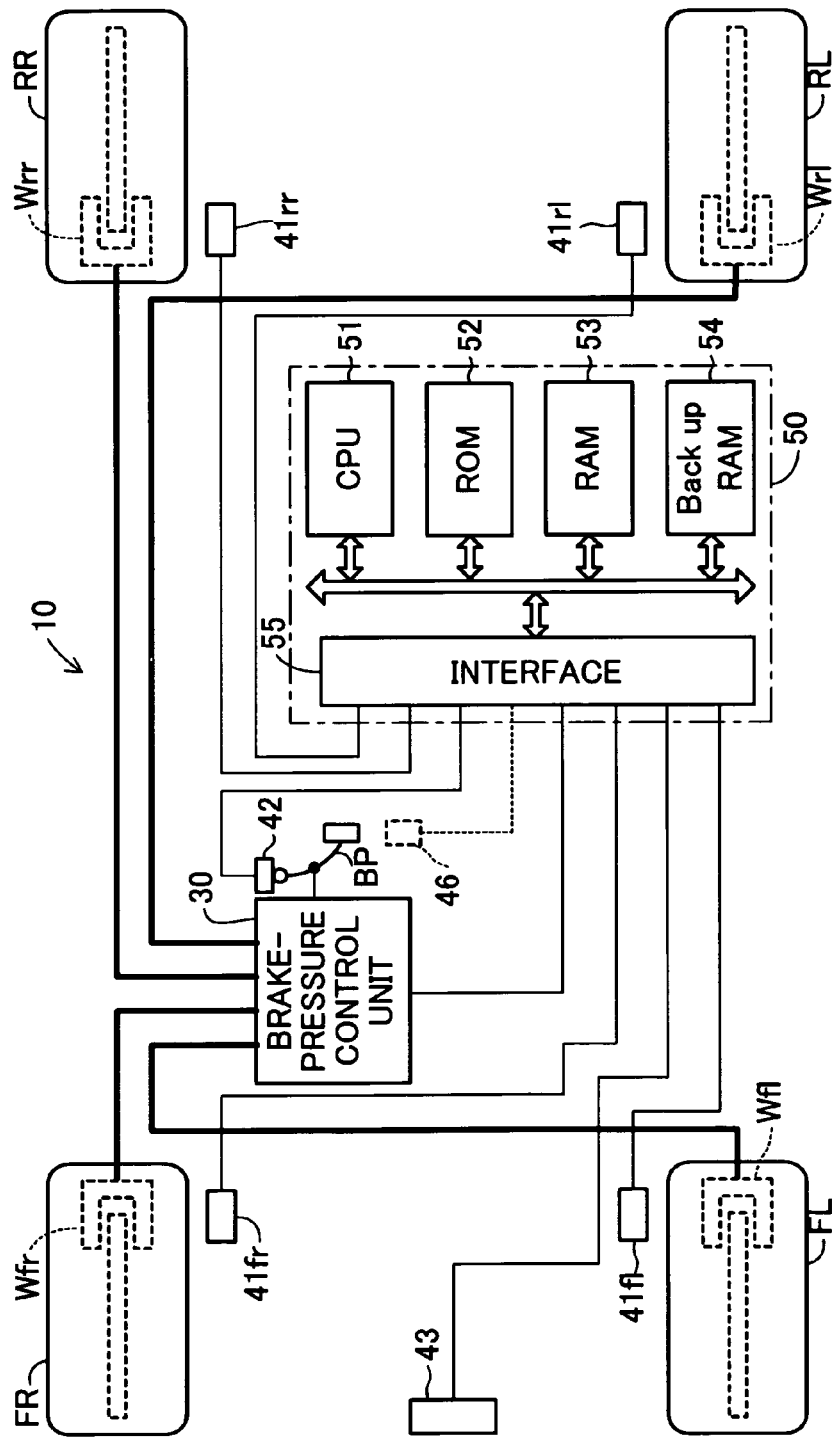
FIG. 1 is a schematic diagram of a vehicle equipped with an automatic brake control unit according to a first embodiment of the invention.

An automatic brake control unit according to embodiments of the invention will be described with reference to the drawings. FIG. 1 is a schematic diagram of a vehicle equipped with an automatic braking device 10 incorporating an automatic brake control unit according to a first embodiment of the invention.

First Embodiment

The automatic braking device 10 includes a brake-pressure control unit 30 for generating braking force by brake pressure into the wheels.

Figure 2:
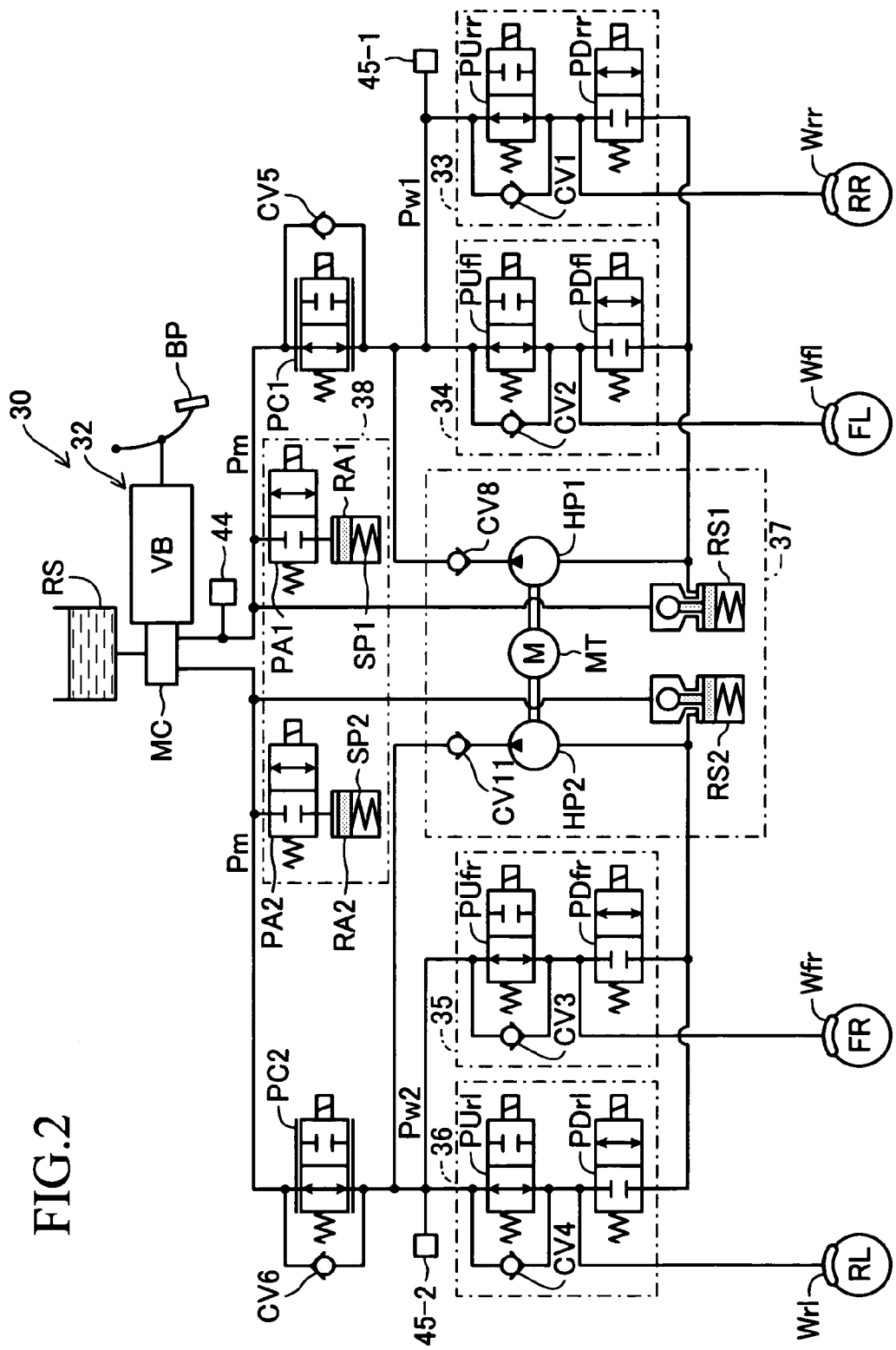
FIG. 2 is a schematic diagram of the brake-pressure control unit shown in FIG. 1.

As shown in FIG. 2, the brake-pressure control unit 30 includes a brake-pressure generating section 32 that generates a hydraulic pressure according to the operating force of a brake pedal BP; an RR-brake-pressure control section 33, an FL-brake-pressure control section 34, an FR-brake-pressure control section 35, and an RL-brake-pressure control section 36 which can control the hydraulic pressure of a brake supplied to wheel cylinders Wrr, Wfl, Wfr, and Wrl disposed for wheels RR, FL, FR, and RL, respectively; a reflux-brake-fluid supply section 37; and a brake-override-time-brake-fluid sucking section 38.

The brake-pressure generating section 32 includes a vacuum booster VB that is driven by the operation of a brake pedal BP; and a master cylinder MC connected to the vacuum booster VB. The vacuum booster VB boosts the operating force of the brake pedal BP using air pressure (negative pressure) in the suction pipe of an engine (not shown) at a specified ratio and transmits the boosted operating force to the master cylinder MC.

The master cylinder MC has two systems of output ports including a first port and a second port, and receives brake fluid from a reservoir RS to generate a first master-cylinder pressure Pm according to the boosted operating force from the first port, and generate a second master-cylinder pressure Pm according to the boosted operating force and substantially equal to that of the first master-cylinder pressure from the second port.

Since the structure and operation of the master cylinder MC and the vacuum booster VB are well known, their detailed description will be omitted here. Thus the master cylinder MC and the vacuum booster VB (brake-pressure generating means) generate the first master-cylinder pressure and the second master-cylinder pressure.

A normally open linear solenoid valve PC1 is interposed between the first port of the master cylinder MC and the upper stream of the RR-brake-pressure control section 33 and the upper stream of the FL-brake-pressure control section 34. Similarly, a normally open linear solenoid valve PC2 is interposed between the second port of the master cylinder MC and the upper stream of the FR-brake-pressure control section 35 and the upper stream of the RL-brake-pressure control section 36. The details of the operation of the normally open linear solenoid valves PC1 and PC2 (pressure-controlling sections) will be described later.

The RR-brake-pressure control section 33 includes a pressure-intensifying valve PUrr that is a two-port two-position switchover normally open electromagnetic switch valve and a pressure-reducing valve PDrr that is a two-port two-position switchover normally closed electromagnetic switch valve. The pressure-intensifying valve PUrr can communicate or interrupt the upper stream of the RR-brake-pressure control section 33 and the wheel cylinder Wrr (to be described later) with each other. The pressure-reducing valve PDrr can communicate or interrupt the wheel cylinder Wrr and a reservoir RS1 from each other. As a result, the brake pressure in the wheel cylinder Wrr (wheel-cylinder pressure Pwrr) can be intensified, maintained, or reduced by the control of the pressure-intensifying valve PUrr and the pressure-reducing valve PDrr.

In addition, the pressure-intensifying valve PUrr has a check valve CV1, in parallel, which permits brake fluid to flow only in one direction from the wheel cylinder Wrr to the upper stream of the RR-brake-pressure control section 33. Thus, when the operated brake pedal BP is opened, the wheel-cylinder pressure Pwrr is reduced quickly.

Similarly, the FL-brake-pressure control section 34 includes a pressure-intensifying valve PUfl and a pressure-reducing valve PDfl; the FR-brake-pressure control section 35 includes a pressure-intensifying valve PUfr and a pressure-reducing valve PDfr; and the RL-brake-pressure control section 36 includes a pressure-intensifying valve PUrl and a pressure-reducing valve PDrl. Thus, the brake pressure in the wheel cylinders Wfl, Wfr, and Wrl (wheel-cylinder pressure Pwfl, Pwfr, and Pwrl) can be intensified, maintained, or reduced by controlling the pressure-intensifying valves and the pressure-reducing valves. The pressure-intensifying value PUfl has a check valve CV2, the pressure-intensifying valve PUfr has a check valve CV3, and the pressure-intensifying valve PUrl has a check valve CV4, in parallel, which have the same function as that of the check valve CV1.

The reflux-brake-fluid supply section 37 includes a direct-current motor MT and two hydraulic pumps (gear pumps) HP1 and HP2 (pressurizing section) driven by the motor MT at the same time. The hydraulic pump HP1 dumps up the brake fluid in the reservoir RS1 returning from the pressure-reducing valves PDrr and PDfl, and supplies it to the upper stream of the RR-brake-pressure control section 33 and the FL-brake-pressure control section 34 via a check valve CV8.

Similarly, the hydraulic pump HP2 dumps up the brake fluid in the reservoir RS2 returning from the pressure-reducing valves PDfr and PDrl, and supplies it to the upper stream of the FR-brake-pressure control section 35 and the RL-brake-pressure control section 36 via a check valve CV11.

The brake-override-time-brake-fluid sucking section 38 includes a reservoir RA1 connected to a hydraulic circuit between the first port of the master cylinder MC and the normally open linear solenoid valve PC1; a cut valve PA1 that is a normally closed electromagnetic switch valve that can permit or prohibit the introduction of the brake fluid from the hydraulic circuit between the first port of the master cylinder MC and the normally open linear solenoid valve PC1; a reservoir RA2 connected to a hydraulic circuit between the second port of the master cylinder MC and the normally open linear solenoid valve PC2; and a cut valve PA2 that is a normally closed electromagnetic switch valve that can permit or prohibit the introduction of the brake fluid from the hydraulic circuit between the second port of the master cylinder MC and the normally open linear solenoid valve PC2.

The reservoirs RA1 and RA2 have coil springs SP1 and SP2 (elastic members, hydraulic-pressure controlling mechanisms) at the bottom, respectively, which are compressed by a force depending on the internal brake pressure. Thus, the capacity of the reservoirs RA1 and RA2 increases with an increase in the internal brake pressure (i.e., master-cylinder pressure Pm). In other words, the brake pressure in the reservoirs RA1 and RA2 (i.e., first and second master-cylinder pressures Pm) increases at a gradient determined from the spring constant of the coil springs SP1 and SP2 (and the pressure-receiving area of the bottom) with an increase in the amount of brake fluid sucked into the interior. The specifications (the spring constant, the maximum capacity and so on) of the reservoirs RA1 and RA2 are the same.

The normally open linear solenoid valve PC1 will now be described. The valve element of the normally open linear solenoid valve PC1 always receives an opening force based on the biasing force from a coil spring (not shown), and also an opening force based on the pressure difference (hereinafter, sometimes simply referred to as "an actual pressure difference $\Delta P$") obtained by subtracting the first master-cylinder pressure Pm from the pressure Pw1 at the upper stream of the RR-brake-pressure control section 33 and the upper stream of the FL-brake-pressure control section 34, and a closing force based on a sucking force that increases in proportion to a current (i.e., a command current Id) passing through the normally open linear solenoid valve PC1.

Figure 3:
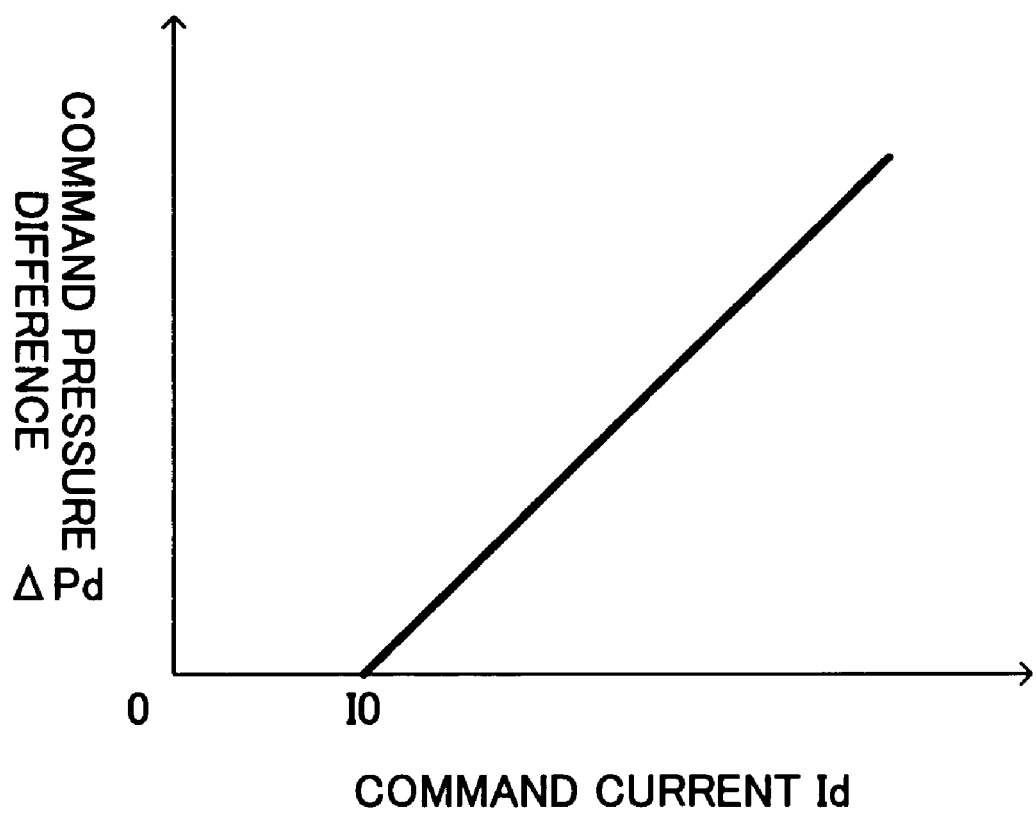
FIG. 3 is a graph showing the relationship between the command current and the command pressure difference for a normally open linear solenoid valve shown in FIG. 2.

As a result, as shown in FIG. 3, a command pressure difference $\Delta Pd$ corresponding to the sucking force is determined so as to increase in proportion to the command current Id. Here, reference symbol 10 is a current value corresponding to the biasing force of the coil spring. The normally open linear solenoid valve PC1 closes when the command pressure difference $\Delta Pd$ is larger than the actual pressure difference $\Delta P$ to interrupt the communication between the first port of the master cylinder MC and the upper stream of the RR-brake-pressure control section 33 and the upper stream of the FL-brake-pressure control section 34 from each other.

On the other hand, when the command pressure difference $\Delta Pd$ is smaller than the actual pressure difference $\Delta P$, the normally open linear solenoid valve PC1 opens to communicate the first port of the master cylinder MC and the upper stream of the RR-brake-pressure control section 33 and the upper stream of the FL-brake-pressure control section 34 with each other. As a result, the brake fluid in the upper stream of the RR-brake-pressure control section 33 and the upper stream of the FL-brake-pressure control section 34 (supplied from the hydraulic pump HP1) flows toward the first port of the master cylinder MC via the normally open linear solenoid valve PC1 so that the actual pressure difference $\Delta P$ agrees with the command pressure difference $\Delta Pd$. The brake fluid flowing into the first port of the master cylinder MC is returned to the reservoir RS1.

In other words, when the motor MT (accordingly, the hydraulic pumps HP1 and HP2) is in driven mode, the actual pressure difference $\Delta P$ (the allowable maximum value thereof) is controlled according to the command current Id to the normally open linear solenoid valve PC1. At that time, the pressure Pw1 reaches a value (Pm+$\Delta Pd$) that is obtained by adding the actual pressure difference $\Delta P$ (accordingly, command pressure difference $\Delta Pd$) to the first master-cylinder pressure Pm.

On the other hand, when the normally open linear solenoid valve PC1 is brought into a nonenergized state (i.e., the command current Id is set to "0"), the normally open linear solenoid valve PC1 stays in open position by the biasing force of the coil spring. At that time, the actual pressure difference $\Delta P$ reaches "0" to bring the pressure Pw1 equal to the first master-cylinder pressure Pm.

Also the normally open linear solenoid valve PC2 has the same structure and operation as those of the normally open linear solenoid valve PC1. Accordingly, when the motor MT (i.e., the hydraulic pumps HP1 and HP2) is in driven mode, the pressure Pw2 at the upper stream of the FR-brake-pressure control section 35 and the upper stream of the RL-brake-pressure control section 36 reaches a value (Pm+$\Delta Pd$) that is obtained by adding the command pressure difference $\Delta Pd$ (the amount of pressurization) to the second master-cylinder pressure Pm. On the other hand, when the normally open linear solenoid valve PC2 is brought into a nonenergized state, the pressure Pw2 becomes equal to the second master-cylinder pressure Pm.

In addition, the normally open linear solenoid valve PC1 has a check valve CV5 in parallel, which permits brake fluid to flow only in one direction from the first port of the master cylinder MC to the upper stream of the RR-brake-pressure control section 33 and the upper stream of the FL-brake-pressure control section 34. Accordingly, even while the actual pressure difference $\Delta P$ is controlled according to the command current Id for the normally open linear solenoid valve PC1, a brake pressure itself (i.e., the first master-cylinder pressure Pm) corresponding to the operating force of the brake pedal BP can be applied to the wheel cylinders Wrr and Wfl when the first master-cylinder pressure Pm becomes higher than the pressure Pw1 by the operation of the brake pedal BP. Also the normally open linear solenoid valve PC2 has a check valve CV6 in parallel, which has the same function as that of the check valves CV5.

As has been described, the brake-pressure control unit 30 has a two-system hydraulic circuit including a system for the rear right wheel RR and the front left wheel FL and a system for the rear left wheel RL and the front right wheel FR. The brake-pressure control unit 30 can apply a brake pressure (i.e., the master-cylinder pressure Pm) corresponding to the operating force of the brake pedal BP to a wheel cylinder W when all the solenoid valves are in nonenergized state. Briefly, Pw1, Pw2, Pw=Pm holds.

The symbol  affixed to the end of each variable indicates a comprehensive notation, such as "fl" and "fr", that is affixed to indicate for which of wheels the variable is. For example, the wheel cylinder W comprehensively indicates the front left wheel cylinder Wfl, the front right wheel cylinder Wfr, the rear left wheel cylinder Wrl, and the rear right wheel cylinder Wrr.

On the other hand, when the motor MT (accordingly, the hydraulic pumps HP1 and HP2) is driven, and the normally open linear solenoid valves PC1 and PC2 are energized by the command current Id, the wheel cylinder W can be supplied with a brake pressure higher than the first master-cylinder pressure Pm by a command pressure difference $\Delta Pd$ determined from the command current Id. Briefly, Pw1, Pw2, Pw=Pm+$\Delta Pd$ holds.

Thus, the brake-pressure control unit 30 can achieve automatic brake control (low-speed-driving following-distance control) irrespective of the operation of the brake pedal BP by the driver using the hydraulic pressure obtained by adding the command pressure difference $\Delta Pd$ (the amount of pressurization) to the master-cylinder pressure Pm according to the instruction of an electric controller 50 (to be described later).

In addition, the brake-pressure control unit 30 can adjust the wheel-cylinder pressure Pw individually by controlling the pressure-intensifying valve PU and the pressure-reducing valve PD. Particularly, the brake-pressure control unit 30 can adjust the wheel-cylinder pressure Pw to a hydraulic pressure lower than that obtained by adding the command pressure difference $\Delta Pd$ (the amount of pressurization) to the master-cylinder pressure Pm by controlling the pressure-reducing valve PD**. In short, the brake-pressure control unit 30 can adjust the braking force to the wheels individually irrespective of the operation of the brake pedal BP by the driver.

Referring again to FIG. 1, the automatic braking device 10 includes electromagnetic-pickup wheel speed sensors 41*fl*, 41*fr*, 41*rl*, and 41*rr* that output signals having frequencies corresponding to the speeds of the wheels FL, FR, RL, and RR, respectively; a brake switch 42 that outputs an on-off signal depending on the operation of the brake pedal BP; a radar sensor 43 that detects the distance L between a preceding vehicle and the vehicle to output the following distance L; a master-cylinder-hydraulic-pressure sensor 44 (refer to FIG. 2) that detects a (first) master-cylinder pressure and outputs a signal indicative of the master-cylinder pressure Pm; a wheel-cylinder-pressure sensor 45-1 (refer to FIG. 2) that detects the pressure at the upper stream of the RR-brake-pressure control section 33 and the FL-brake-pressure control section 34 and outputs a signal indicative of the wheel-cylinder pressure Pw1; and a wheel-cylinder-pressure sensor 45-2 (refer to FIG. 2) that detects the pressure at the upper stream of the FR-brake-pressure control section 35 and the RL-brake-pressure control section 36 and outputs a signal indicative of the wheel-cylinder pressure Pw2.

The automatic braking device 10 includes the electric controller 50. The electric controller 50 is a microcomputer including a CPU 51; a ROM 52 that stores a routine (program) for the CPU 51, a table (a lookup table and a map), a constant, etc; a RAM 53 in which the CPU 51 temporarily stores data as needed; a backup RAM 54 that stores data during power-on and holds the stored data during power-off; and an interface 55 including an AD converter. The interface 55 connects to the sensors 41 to 45, sends signals from the sensors 41 to 45 to the CPU 51 and sending a driving signal to the solenoid valves, and sends a driving signal to the solenoid valves of the and the motor MT of the brake-pressure control unit 30 according to the instruction from the CPU 51.

Outline of Automatic Brake Control

The outline of the automatic brake control (low-speed-driving following-distance control) of the automatic braking device 10 (hereinafter, also referred to as "the device") incorporating the automatic brake control unit according to the first embodiment of the invention will be described. The automatic brake control is an operation for causing a vehicle to automatically generate a specified braking force to maintain an appropriate following distance L independently of driver's brake pedal operation when the after-mentioned automatic-brake-operation start conditions that the following distance L between the vehicle and the preceding vehicle becomes smaller than a specified reference value, etc. are met while the vehicle runs at a relatively low speed during traffic congestion.

Specifically, when the automatic-brake-operation start conditions are met, the device determines a target pressure difference $\Delta Pt$ (a lower limit $PwL \leq \Delta Pt \leq$ an upper limit PwH) that is the target value of the actual pressure difference $\Delta P$ (the amount of pressurization), as will be described later, and controls the motor MT and the normally open linear solenoid valves PC1 and PC2 so that the actual pressure difference $\Delta P$ agrees with the target pressure difference $\Delta Pt$. Thus, the wheel-cylinder pressures Pw1 and Pw2 (=Pw**) are controlled to be higher than the master-cylinder pressure Pm by the target pressure difference $\Delta Pt$, resulting in automatically generating a braking force corresponding to the target pressure difference $\Delta Pt$. This is the outline of the automatic brake control.

Improving Brake Feeling During Brake Override

Then an improvement in brake feeling by the operation of the brake-override-time-brake-fluid sucking section 38 when a driver operates a brake pedal with the automatic brake control in operation will be described.

Figure 4:
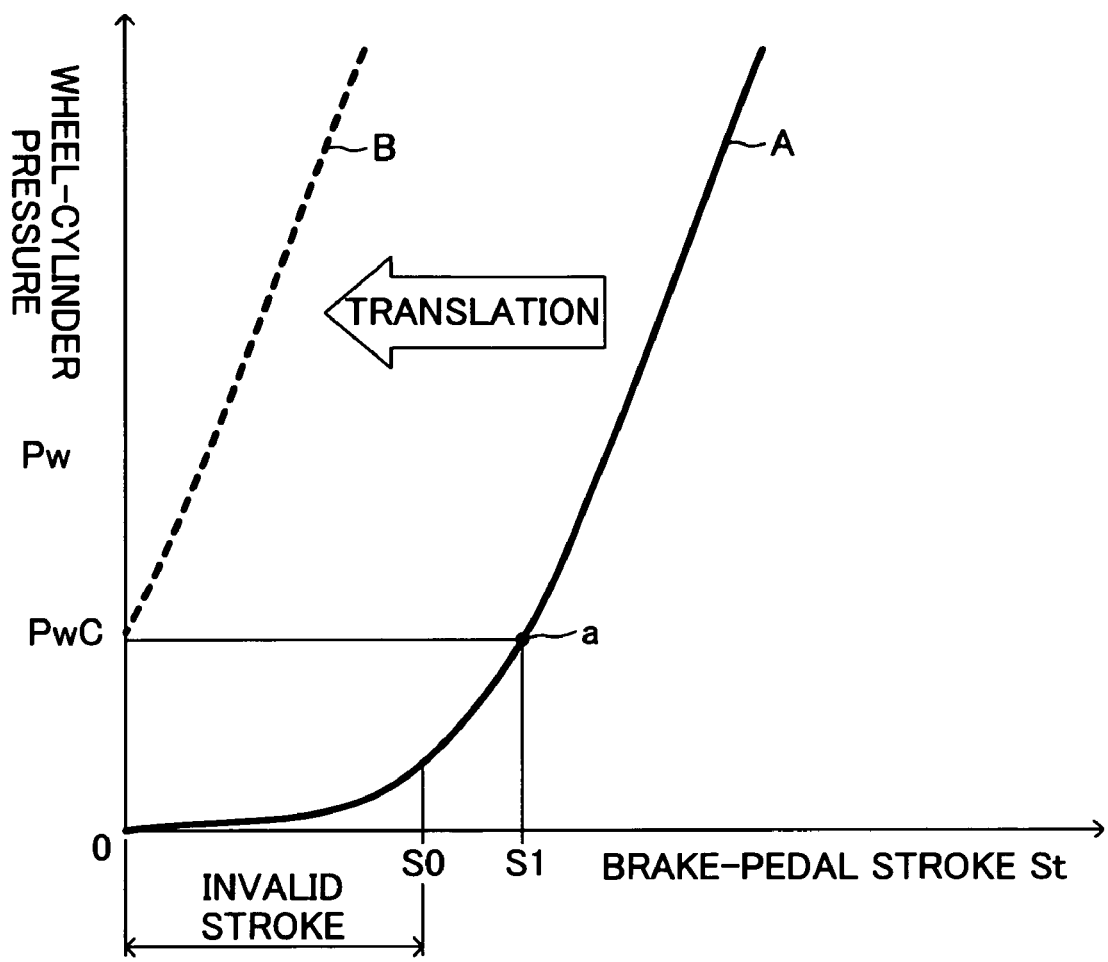
FIG. 4 is a graph showing the relationship between a brake-pedal stroke and a wheel-cylinder pressure for the case where a normal brake operation is executed and the case where a brake override is executed.
Figure 14:
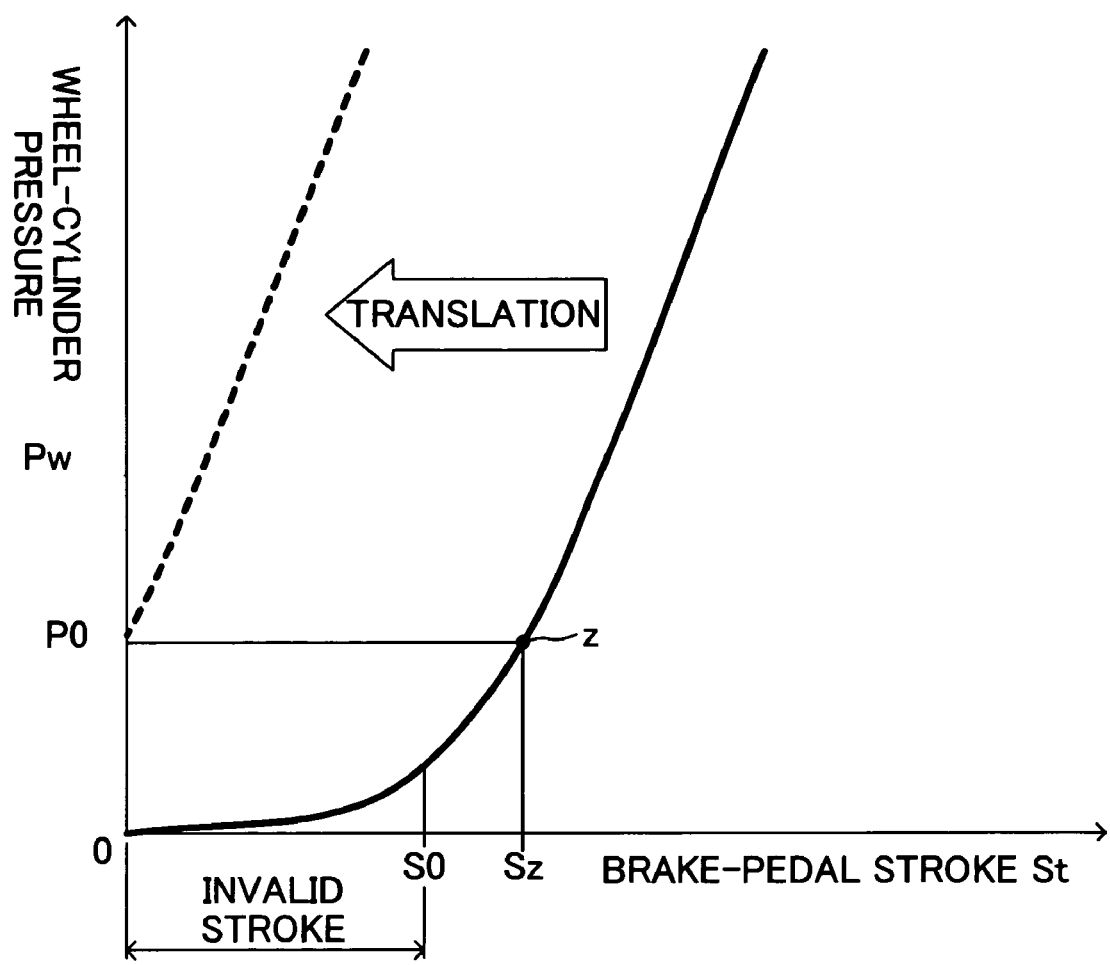
FIG. 14 is a graph showing the relationship between a brake-pedal stroke and a wheel-cylinder pressure for the case where a normal brake operation is executed and the case where a brake override is executed.

In this system, when a drive operates a brake pedal with the automatic brake control out of operation (i.e., the above-described "normal brake operation" is executed), the relationship (static relationship) between the stroke St of the brake pedal BP and the wheel-cylinder pressure Pw can be expressed by the solid line A in FIG. 4, like the solid line shown in FIG. 14.

Specifically, in the initial state in which the brake-pedal stroke St reaches from "0" to an invalid stroke S0, the wheel-cylinder pressure Pw increases little even when the brake-pedal stroke St increases owing to the consumption of the above-described invalid fluid. Accordingly, a wheel-cylinder pressure Pw that can contribute to the braking of the vehicle cannot be virtually generated. In other words, the lower limit PwL is higher than the wheel-cylinder pressure Pw corresponding to the invalid stroke S0 on the solid line A.

The brake pad is already in contact with the brake disc in the stage in which the brake-pedal stroke has exceeded the invalid stroke S0. In this stage, the wheel-cylinder pressure Pw that can virtually contribute to the braking of the vehicle increases at a relatively large increase gradient as shown by the solid line A with an increase in the brake-pedal stroke St. The increase characteristic of the wheel-cylinder pressure Pw in this stage mainly depends on the operation characteristic of the vacuum booster VB (refer to FIG. 2), the wheel cylinder W**, the brake pipe arrangement, and the elasticity characteristic of the brake pad.

Then the relationship (static relationship) between the stroke St of the brake pedal BP and the wheel-cylinder pressure Pw during a brake override will be considered. At first, assume that the device has not the brake-override-time-brake-fluid sucking section 38.

An example will be described in which the target pressure difference $\Delta Pt$ (accordingly, the actual pressure difference $\Delta P$) is maintained at a certain value PwC (PwL<PwC<PwH) by the automatic brake control, and as a result, the wheel-cylinder pressure Pw is controlled to be the value PwC at the start of the brake-pedal operation by the driver (i.e., at the start of an override, St=0).

When the brake override is executed, the brake pad is already in contact with the brake disc at the stage in which the brake-pedal stroke St is "0". Accordingly, no invalid fluid is consumed. As a result, the increasing characteristic of the wheel-cylinder pressure Pw corresponding to the increase in the brake-pedal stroke St from "0" agrees with the increase characteristic of the wheel-cylinder pressure Pw corresponding to an increase in the brake-pedal stroke St in normal brake operation from the value S1, which corresponds to the case of "wheel-cylinder pressure Pw=PwC (refer to FIG. 4) (i.e., the part upper than the point a on the solid line A.

In other words, the relationship (static relationship) between the stroke St of the brake pedal BP and the wheel-cylinder pressure Pw in this case agrees with the relationship indicated by the line obtained by translating the part of the wheel-cylinder pressure Pw on the solid line A which is higher than the value PwC (the part upper than the point a on the solid line A) to the left in FIG. 14 by a length corresponding to the brake-pedal stroke S1, as indicated by the broken line B in FIG. 4.

Assuming that the brake-override-time-brake-fluid sucking section 38 is not disposed, as described above, the wheel-cylinder pressure Pw relative to the same brake-pedal stroke St (accordingly, a braking force applied to the vehicle) when the brake override is not executed (the broken line B of FIG. 4) is significantly higher than that of the normal brake operation (the solid line A of FIG. 4). This causes driver's brake feeling with significant wrongness during the brake override.

In contrast, the device is actually equipped with the brake-override-time-brake-fluid sucking section 38, as described above. Thus, when the automatic brake control is not executed, the device maintains the cut valves PA1 and PA2 in a nonenergized state (accordingly, in close position). On the other hand, the case where the automatic brake control is in operation and the cut valves PA1 and PA2 are maintained in an energized state (accordingly, in open position) will be considered.

As in the example indicated by the broken line B of FIG. 4, an example will be described in which the target pressure difference ΔPt is maintained at a value PwC by the automatic brake control, and as a result, the wheel-cylinder pressure Pw is controlled to be the value PwC at the time the brake-pedal stroke St is 0. The static relationship between the brake-pedal stroke St and the wheel-cylinder pressure Pw for the brake override is indicated by the broken line B in FIG. 5.

Figure 5:
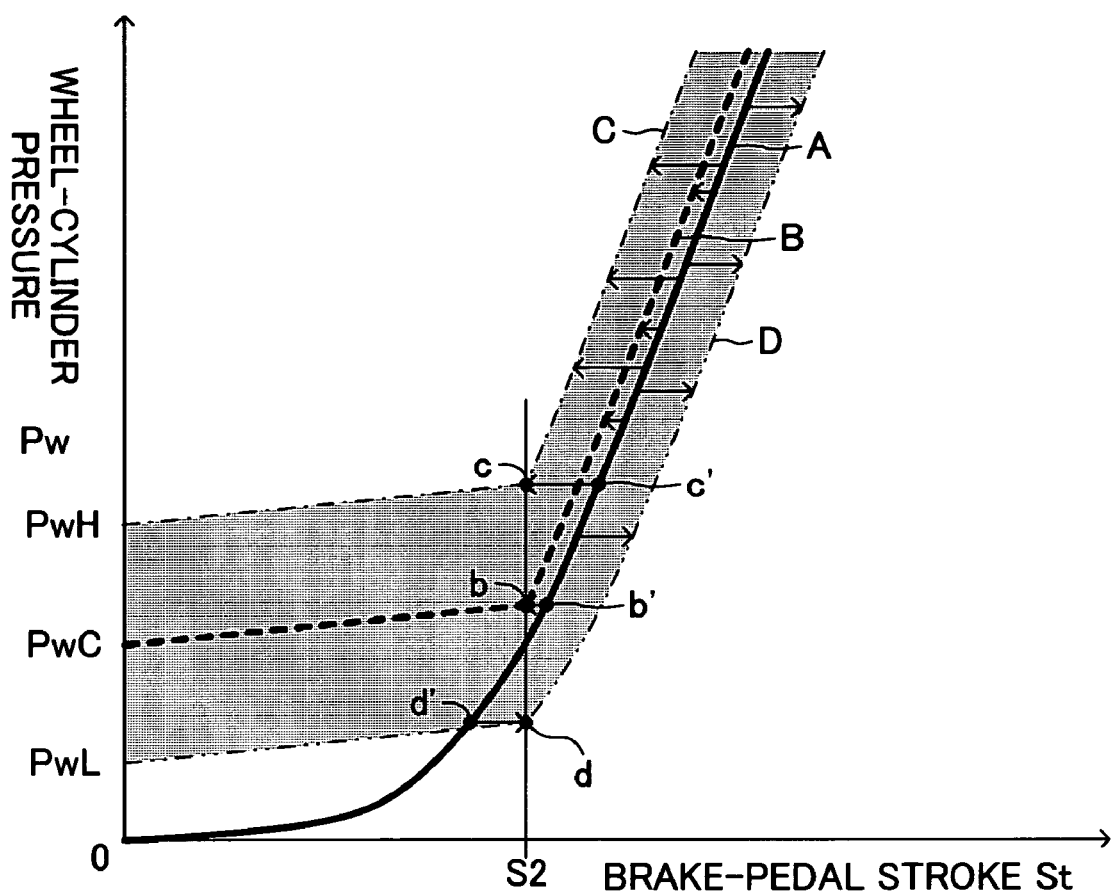
FIG. 5 is a graph showing the static relationship between a brake-pedal stroke and a wheel-cylinder pressure for the case where a brake override is executed, which are obtained by application of the invention.

Referring to FIG. 5, the value S2 is a brake-pedal stroke St corresponding to the sum of the maximum capacities of the reservoirs RA1 and RA2, which is equal to the value S1 in FIG. 4. The solid line A in FIG. 5 indicates the relationship between the brake-pedal stroke St and the wheel-cylinder pressure Pw for a normal brake operation, as in FIG. 4. The broken line B of FIG. 5 will then be described.

In the initial stage in which the brake-pedal stroke St reaches from "0" to a value S2, all of the brake fluid discharged from the master cylinder MC with an increase in the brake-pedal stroke St is sucked to the reservoirs RA1 and RA2 (accordingly, the capacity of the reservoirs RA1 and RA2 increases from the minimum capacity (e.g., from "0")).

As a result, the brake pressure (i.e., the master-cylinder pressure Pm) in the reservoirs RA1 and RA2 increases from "0" at a gradient determined from the spring constants of the coil springs SP1 and SP2 (and the pressure-receiving area of the bottom of the reservoir). Correspondingly, as shown by the broken line B of FIG. 5, also the wheel-cylinder pressures Pw1 and Pw2 (=Pm+ΔPt) increase from the value PwC to a value corresponding to the point b (refer to FIG. 5) at the same gradient because the target pressure difference ΔPt is maintained constant at the value PwC.

When the brake-pedal stroke St reaches the value S2, the capacity of the reservoirs RA1 and RA2 becomes the maximum, so that the reservoirs RA1 and RA2 become unable to suck further brake fluid. Accordingly, the increase characteristic of the wheel-cylinder pressure Pw corresponding to the increase in the brake-pedal stroke St from the value S2 agrees with the increase characteristic of the wheel-cylinder pressure Pw corresponding to an increase in the brake-pedal stroke St in normal brake operation (the solid line A in FIG. 5) from "the value corresponding to the case where the wheel-cylinder pressure Pw corresponds to the point b" (i.e., the part upper than the point a on the solid line A).

In other words, the relationship (static relationship) between the brake-pedal stroke St and the wheel-cylinder pressure Pw in the case where the brake-pedal stroke St exceeds the value S2 agrees with the relationship indicated by the line obtained by translating the part upper than the point b' on the solid line A to the left in FIG. 5 until the point b' agrees with the point b, as indicated by the broken line B in FIG. 5.

As apparent from the comparison between the broken line B of FIG. 5 and the broken line B of FIG. 4, the relationship indicated by the broken line B of FIG. 5 is closer to the relationship for the normal brake operation (indicated by the solid line A) than to that indicated by the broken line B of FIG. 4. In other words, placing the cut valves PA1 and PA2 in open position when the automatic brake control is in operation provides a brake feeling with little wrongness during the brake override.

When the target pressure difference ΔPt for the automatic brake control is maintained at the upper limit PwH, so that the wheel-cylinder pressure Pw has reached the upper limit PwH at the point in time that the brake-pedal stroke St is "0", the relationship (static relationship) between the brake-pedal stroke St and the wheel-cylinder pressure Pw can be indicated by the alternate short and long dashed line C of FIG. 5.

In the initial stage in which the brake-pedal stroke St reaches from "0" to the value S2, the wheel-cylinder pressures Pw1 and Pw2 (=Pm+ΔPt) increases to a value corresponding to the point c (refer to FIG. 5) from the value PwH with an increase in the brake-pedal stroke St at the same gradient as that of the broken line B.

When the brake-pedal stroke St exceeds the value S2, the relationship (static relationship) between the brake-pedal stroke St and the wheel-cylinder pressure Pw becomes the relationship indicated by the line obtained by translating the part upper than the point c' of the line A to the left in FIG. 5 until the point c' agrees with the point c.

Similarly, when the target pressure difference ΔPt for the automatic brake control is maintained at the lower limit PwL, so that the wheel-cylinder pressure Pw has reached the lower limit PwL at the point in time that the brake-pedal stroke St is "0", the relationship (static relationship) between the brake-pedal stroke St and the wheel-cylinder pressure Pw can be indicated by the chain double dashed line D of FIG. 5.

In other words, in the initial stage in which the brake-pedal stroke St reaches from "0" to the value S2, the wheel-cylinder pressures Pw1 and Pw2 (=Pm+ΔPt) increases from the value PwL to a value corresponding to the point d (refer to FIG. 5) with an increase in the brake-pedal stroke St at the same gradient as that of the broken line B.

When the brake-pedal stroke St exceeds the value S2, the relationship (static relationship) between the brake-pedal stroke St and the wheel-cylinder pressure Pw becomes the relationship indicated by the line obtained by translating the part upper than the point d' of the line A to the right in FIG. 5 until the point d' agrees with the point d.

Thus, when the automatic brake control is in operation (i.e., when the target pressure difference ΔPt is set to a certain value equal to or larger than the lower limit PwL and equal to or smaller than the upper limit PwH), placing the cut valves PA1 and PA2 in open position allows the relationship (static relationship) between the brake-pedal stroke St and the wheel-cylinder pressure Pw to be placed within the region between the alternate short and long dashed line C and the chain double dashed line D in FIG. 5 (refer to the region indicated by the fine dots in FIG. 5).

Accordingly, as is apparent from the comparison between the region surrounded by the alternate short and long dashed line C and the chain double dashed line D of FIG. 5 and the broken line B of FIG. 4, even when the target pressure difference ΔPt (the amount of pressurization) during the automatic brake control fluctuates between the lower limit PwL and the upper limit PwH, the relationship between the brake-pedal stroke St and the wheel-cylinder pressure Pw can be closer to that (indicated by the solid line A) of a normal brake operation rather than that indicated by the broken line B of FIG. 4. Briefly, this can provide a brake feeling of little wrongness during the brake override irrespective of the target pressure difference ΔPt (the amount of pressurization) during the automatic brake control.

The region surrounded by the alternate short and long dashed line C and the chain double dashed line D of FIG. 5 is determined from the increase gradient of the wheel-cylinder pressure Pw until the brake-pedal stroke St reaches from "0" to the value S2 (accordingly, the spring constants of the coil springs SP1 and SP2) and the value S2 (accordingly, the maximum capacities of the reservoirs RA1 and RA2). Thus, the appropriate adjustment of the maximum capacities of the reservoirs RA1 and RA2 and the spring constants of the coil springs SP1 and SP2 allows the driver to have a brake feeling with little wrongness during the brake override.

Preventing Wheel-Cylinder Pressure Relative to Brake-Pedal Stroke from Becoming Lower than that in Normal Brake Operation The region surrounded by the alternate short and long dashed line C and the chain double dashed line D of FIG. 5 has a part lower than (or on the right of) the solid line A of FIG. 5. In other words, the wheel-cylinder pressure Pw relative to the brake-pedal stroke St sometimes becomes lower than that for normal brake operation.

This is not preferable because it prevents the driver from obtaining a desired braking force, generating a brake feeling of significant wrongness. It is therefore necessary to prevent a decrease in the wheel-cylinder pressure Pw relative to the brake-pedal stroke St as compared with that for normal brake operation.

Figure 6:
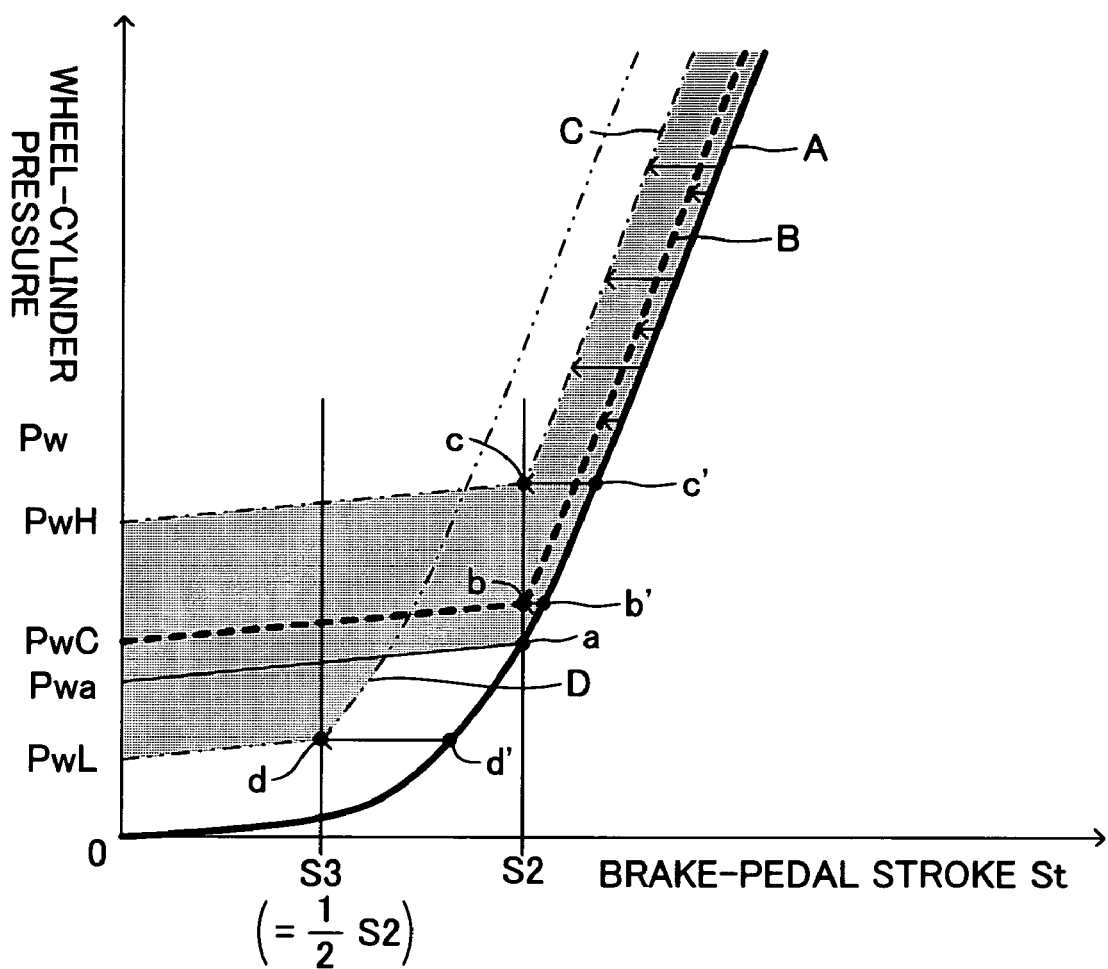
FIG. 6 is a graph showing an improved static relationship between the brake-pedal stroke and the wheel-cylinder pressure for the case where the brake override is executed, shown in FIG. 5.

Accordingly, a specified hydraulic pressure Pwa is introduced, as shown in FIG. 6. When the wheel-cylinder pressure Pw (PwL≦Pw≦PwH) at the start of an override is the specified hydraulic pressure Pwa or more (i.e., Pwa≦Pw≦PwH), the cut valves PA1 and PA2 are maintained in an energized state (accordingly, in open position) during an override. On the other hand, when the wheel-cylinder pressure Pw (PwL≦Pw≦PwH) at the start of an override is smaller than the specified hydraulic pressure Pwa (i.e., PwL≦Pw<Pwa), only the cut valve PA1 is maintained in an energized state (accordingly, in open position) during an override.

Here, the specified hydraulic pressure Pwa is a value (higher than the atmospheric pressure) corresponding to a point on the solid line A of FIG. 6, the same as the line A of FIG. 5, which is a point on a line having the same gradient as the broken line B of FIG. 6 (the same as the broken line B of FIG. 5) in the initial stage in which the brake-pedal stroke St reaches from "0" to the value S2 and at which the brake-pedal stroke St becomes "0" (refer to FIG. 6).

In this case, when a brake override is executed in the case where the target pressure difference ΔPt in automatic brake control is maintained at the lower limit PwL, and the wheel-cylinder pressure Pw is at the lower limit PwL at the start of the brake override, the relationship (static relationship) between the brake-pedal stroke St and the wheel-cylinder pressure Pw can be indicated by the chain double dashed line D of FIG. 6.

Specifically, in the initial stage in which the brake-pedal stroke St reaches from "0" to a value S3 (=(½)·S2) that is a brake-pedal stroke corresponding to the maximum capacity of only the reservoir RA1, the wheel-cylinder pressures Pw1 and Pw2 (=Pm+ΔPt) increase from the value PwL to a value corresponding to the point d (refer to FIG. 6) at substantially the same gradient as the broken line B (more accurately, a gradient determined only from the spring constant of the coil spring SP1 (and the pressure-receiving area of the bottom of the reservoir RA1) with an increase in the brake-pedal stroke St.

When the brake-pedal stroke St exceeds the value S3, the relationship (static relationship) between the brake-pedal stroke St and the wheel-cylinder pressure Pw becomes the relationship obtained by translating the part upper than the point d' on the solid line A to the left in FIG. 6 until the point d' agrees with the point d.

Thus, when the wheel-cylinder pressure Pw (PwL≦Pw≦PwH) at the start of an override is smaller than the specified hydraulic pressure Pwa (i.e., PwL≦Pw<Pwa), the relationship (static relationship) between the brake-pedal stroke St and the wheel-cylinder pressure Pw can always be located within the region above (or on the left of) the solid line A of FIG. 6. As will be understood from FIG. 6, also when the wheel-cylinder pressure Pw (PwL≦Pw≦PwH) at the start of an override is the specified hydraulic pressure Pwa or more (i.e., Pwa≦Pw≦PwH), the relationship (static relationship) between the brake-pedal stroke St and the wheel-cylinder pressure Pw can be always located within the region above (or on the left of) the solid line A of FIG. 6.

In other words, when automatic brake control is in operation (i.e., when the target pressure difference ΔPt is set at a value equal to or more than the limit PwL and equal to or smaller than the upper limit PwH), the relationship (static relationship) between the brake-pedal stroke St and the wheel-cylinder pressure Pw can be located in the region indicated by the fine dots in FIG. 6. This can thus prevent a decrease in the wheel-cylinder pressure Pw relative to the brake-pedal stroke St as compared with that in normal brake operation.

Consequently, when the wheel-cylinder pressure Pw (PwL≦Pw≦PwH) at the start of an override is the specified hydraulic pressure Pwa or more (i.e., Pwa≦Pw≦PwH), the device maintains both of the cut valves PA1 and PA2 in an energized state (accordingly, in open position) during the override; when the wheel-cylinder pressure Pw (PwL≦Pw≦PwH) at the start of an override is smaller than the specified hydraulic pressure Pwa (i.e., PwL≦Pw<Pwa), the device maintains only the cut valve PA1 in an energized state (accordingly, in open position) during the override.

The improvement of the brake feeling during a brake override by the operation of the brake-override-time-brake-fluid absorbing section 38 has been described above.

Actual Operation

The actual operation of the automatic brake control unit according to the first embodiment of the invention will be described with reference to the flowcharts for the routine of the CPU 51 of the electric controller 50 in FIGS. 7 to 10.

Calculating Wheel Speed Etc.

Figure 7:
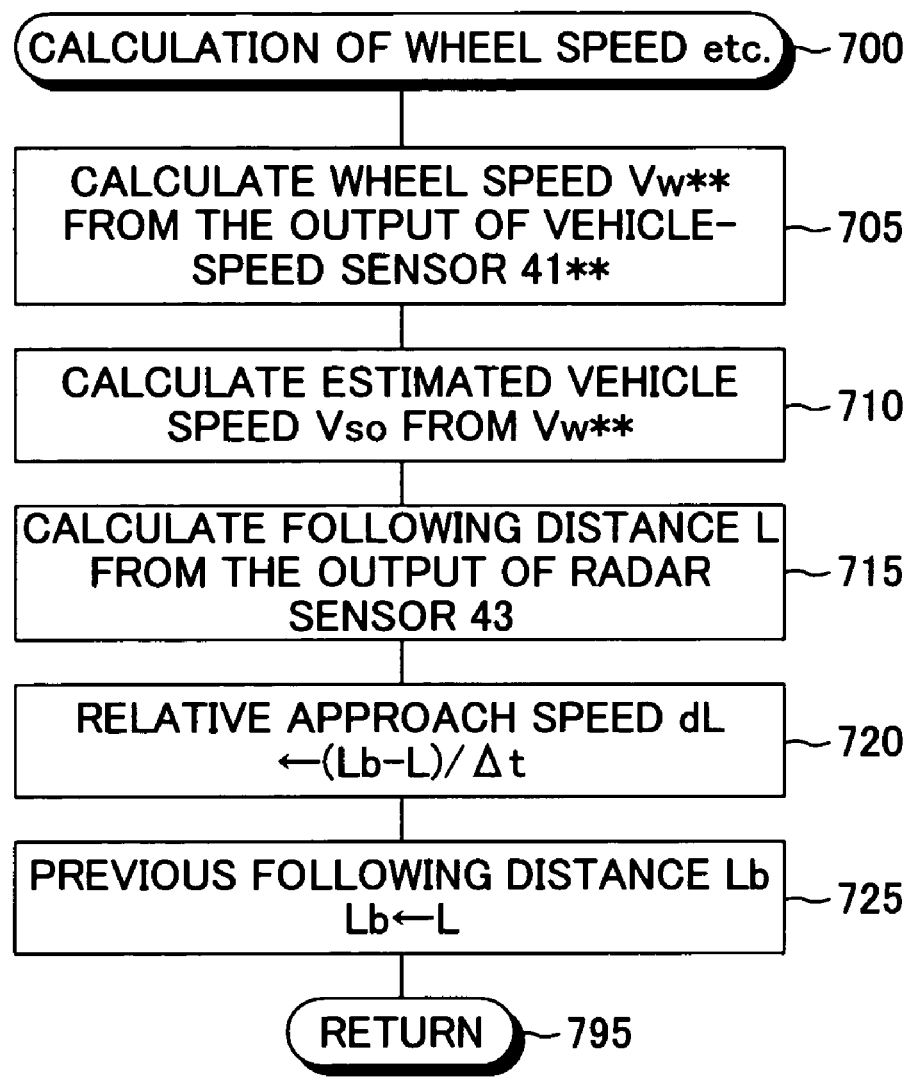
FIG. 7 is a flowchart of the routine for calculating a wheel speed etc. by the CPU of FIG. 1.

The CPU 51 repeatedly executes the routine of calculating a wheel speed and so on, shown in FIG. 7, at a fixed interval (at a time interval Δt, e.g., 6 msec). Accordingly, the CPU 51 starts the operation from step 700 at a predetermined time, and moves to step 705, wherein it calculates the wheel speed Vw (the speed of the outer circumference of a wheel ) of the wheel  at the present time. Specifically, the CPU 51 calculates the wheel speed Vw from the variable frequency of the output of a wheel-speed sensor 41**.

Then the CPU 51 moves to step 710, wherein it calculates an estimated vehicle speed Vso from the calculated wheel speed Vw. When the vehicle is in a driven mode, the estimated vehicle speed Vso is set to the minimum value of the wheel speed Vw; when the vehicle is under braking, the estimated vehicle speed Vso is set to the maximum value of the wheel speed Vw**.

Then the CPU 51 moves to step 715, wherein it calculates the following distance L between the vehicle and the preceding vehicle from the output of the radar sensor 43, and moves to step 720. In step 720, the CPU 51 calculates a relative approach speed dL according to the expression described in step 720. The relative approach speed dL is used to determine whether to start and end the automatic brake control, to be described later.

As the following distance L, the value calculated in step 715 is used. Symbol Lb denotes the previous following distance, for which a value set in step 725 of the previous routine is used. In other words, the CPU 51 sets the previous following distance Lb as the following distance L of this time calculated in step 715. The CPU 51 then moves to step 795, wherein it ends the routine for the time being.

Determining Whether to Start and End Automatic Brake Operation

Figure 8:
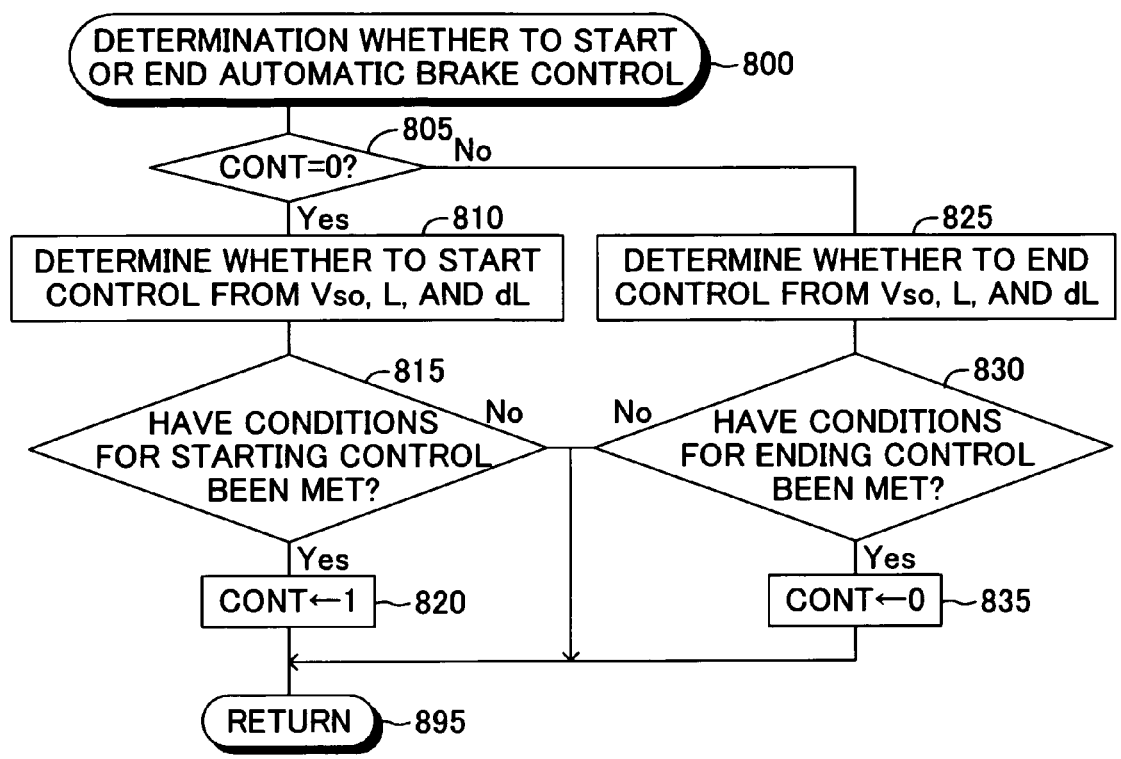
FIG. 8 is a flowchart of the routine for determining whether to start or end the automatic brake control by the CPU of FIG. 1.

The CPU 51 also repeatedly executes the routine of determining whether to start and end the automatic brake control, shown in FIG. 8, at a fixed interval (a time interval Δt, e.g., 6 msec). Accordingly, the CPU 51 starts the operation from step 800 at a predetermined time, and moves to step 805, wherein it determines whether or not the value of an automatic-brake-operation flag CONT is "0". When the value is "1", the automatic-brake-operation flag CONT indicates that the automatic brake control is in operation; when the value is "0", the automatic-brake-operation flag CONT indicates that the automatic brake control is not in operation.

Assuming that the automatic brake control is not in operation (CONT=0), the CPU 51 makes a positive determination in step 805, and moves to step 810, wherein it determines whether or not conditions for starting the automatic brake control are met from the latest value of the estimated vehicle speed Vso obtained in step 710, the latest value of the following distance L obtained in step 715, and the relative approach speed dL obtained in step 720.

The conditions for starting the automatic brake control are met when the estimated vehicle speed Vso is within a specified range, the following distance is equal to or smaller than a specified value, and the relative approach speed dL is equal to or larger than a specified value.

Assuming that the conditions for starting the automatic brake control are not met, the CPU 51 moves to step 815, wherein it makes a negative determination, and moves directly to step 895, wherein it ends the routine for the present. Thereafter, the CPU 51 makes a negative determination every step 815 until the conditions for starting the automatic brake control are met. Thus, the value of the automatic-brake-operation flag CONT is maintained at "0".

Then the case where the conditions for starting the automatic brake control have been met will be described. In this case, the CPU 51 makes a positive determination in step 815, and moves to step 820, wherein it changes the value of the automatic-brake-operation flag CONT from "0" to "1".

Since the value of the automatic-brake-operation flag CONT is "1" thereafter, the CPU 51 makes a negative determination in step 805, and moves to step 825, wherein it determines whether or not conditions for ending the automatic brake control have been met from the latest value of the estimated vehicle speed Vso, the latest value of the following distance L, and the relative approach speed dL.

The conditions for ending the automatic brake control are met, for example, when the estimated vehicle speed Vso is out of a specified range, the following distance is a specified value or more, or the relative approach speed dL is less a specified value.

The conditions for ending the automatic brake control have not been met at the present because it is immediately after the conditions for starting the automatic brake control have been met. Thus, the CPU 51 moves to step 830, wherein it makes a negative determination, and moves directly to step 895, wherein it ends the routine for the present. Thereafter, the CPU 51 makes a negative determination every step 830 until the conditions for ending the automatic brake control are met. Thus, the value of the automatic-brake-operation flag CONT is maintained at "1" after the conditions for starting the automatic brake control have been met until the conditions for ending the automatic brake control are met.

Executing Automatic Brake Operation

Figure 9:
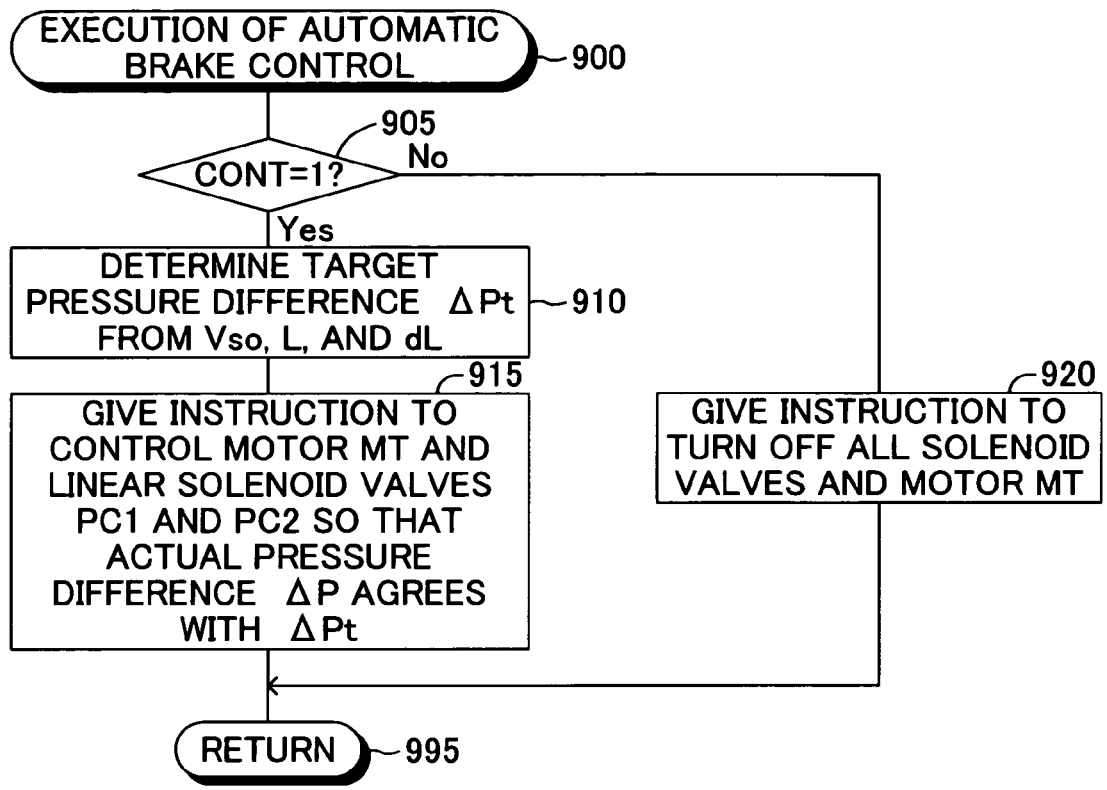
FIG. 9 is a flowchart of the routine for controlling the automatic brake control by the CPU of FIG. 1.

The CPU 51 also repeatedly executes the routine of executing the automatic brake control, shown in FIG. 9, at a fixed interval (e.g., 6 msec). Execution of the routine of FIG. 9 provides the function of the automatic brake control section.

Accordingly, the CPU 51 starts the operation from step 900 at a predetermined time, and moves to step 905, wherein it determines whether or not the value of the automatic-brake-operation flag CONT is "1".

Assuming that it is immediately after the conditions for starting the automatic brake control have been met, it is the time immediately after the value of the automatic-brake-operation flag CONT has been changed from "0" to "1" by the operation in step 820. Thus, the CPU 51 makes a positive determination in step 905, and moves to step 910, where it determines a target pressure difference ΔPt from the latest value of the estimated vehicle speed Vso obtained in step 710, the latest value of the following distance L obtained in step 715, the relative approach speed dL obtained in step 720, and a specified table having Vso, L, and dL as arguments.

Subsequently, the CPU 51 moves to step 915, wherein it provides a control instruction to the motor MT (accordingly, the hydraulic pumps HP1 and HP2) and the normally open linear solenoid valves PC1 and PC2 so that the actual pressure difference ΔP agrees with the determined target pressure difference ΔPt, then moves to step 995, wherein it ends the routine for the present. Thus the automatic brake control is started, and as a result, the actual pressure difference ΔP increases to the target pressure difference ΔPt, thus applying a braking force corresponding to the target pressure difference ΔPt to the vehicle.

Thereafter, the CPU 51 repeats steps 905 to 915 as long as the automatic-brake-operation flag CONT is maintained at "0", thus continuing the automatic brake control.

Executing Cut-Valve Switch Operation

Figure 10:
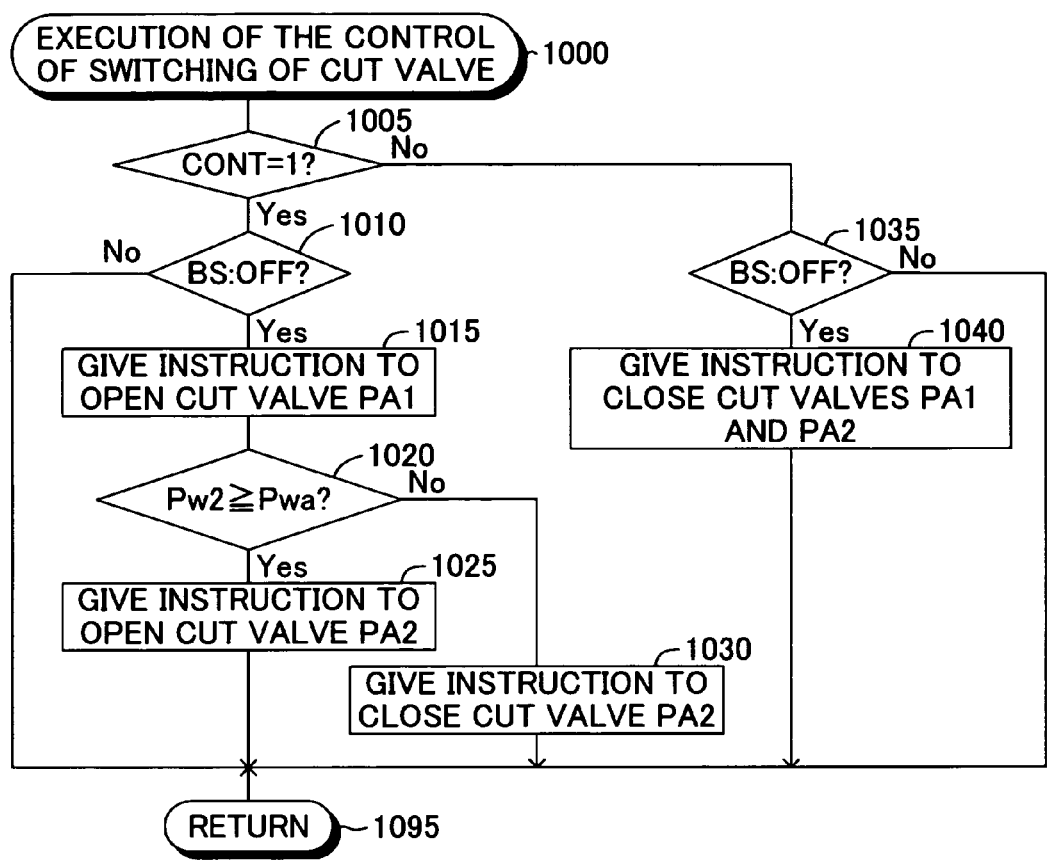
FIG. 10 is a flowchart of the routine for controlling the opening and closing of a cut valve by the CPU of FIG. 1.
Figure 11:
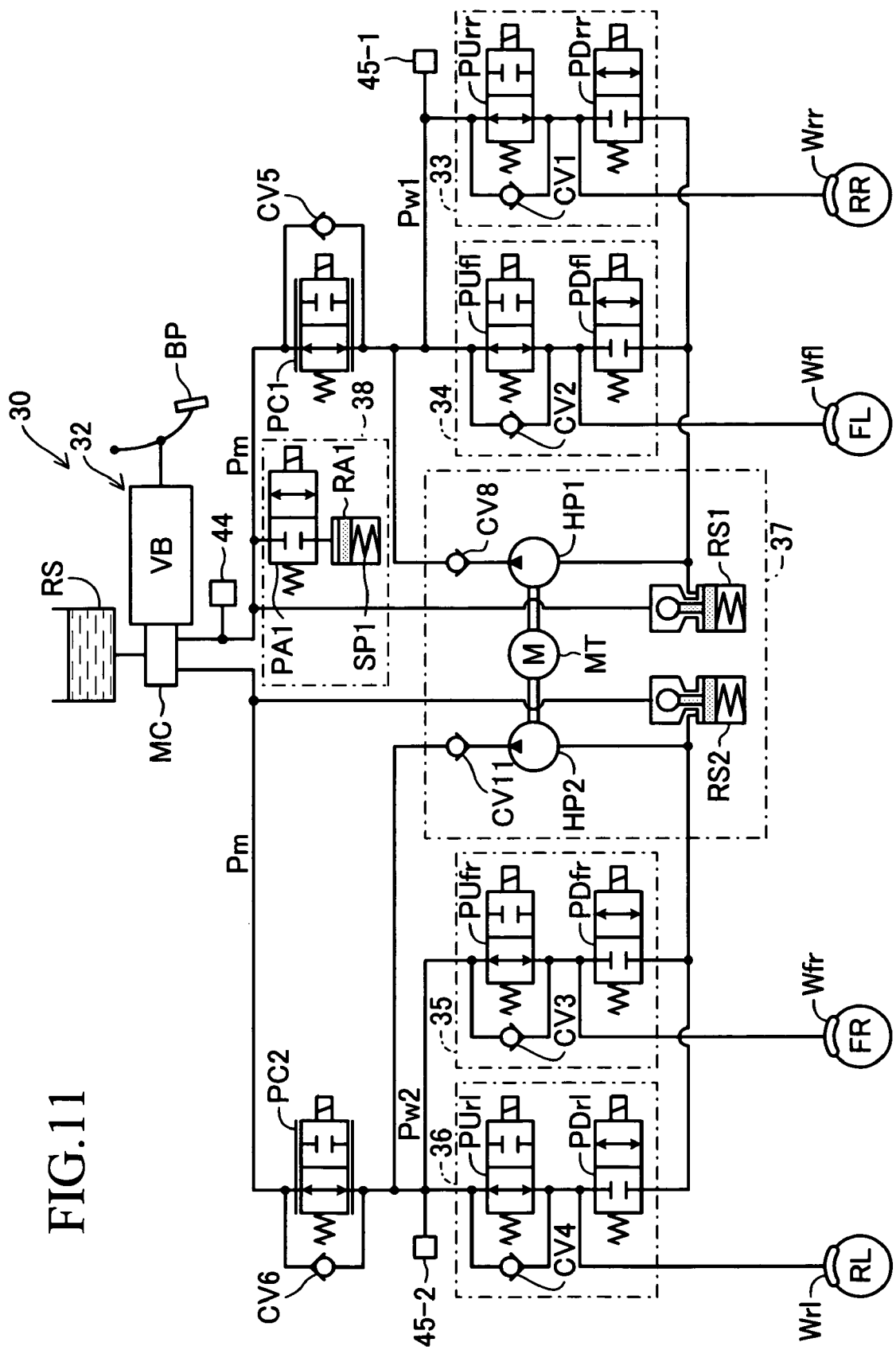
FIG. 11 is a schematic diagram of a brake-pressure controlling unit of an automatic braking device incorporating an automatic brake control unit according to a modification of the first embodiment of the invention.

Furthermore, the CPU 51 repeatedly executes the routine of executing the control of the switching of the cut valves PA1 and PA2, shown in FIG. 10, at a fixed interval (e.g., 6 msec). Execution of the routine of FIG. 10 provides the function of a specific-operation executing section.

Accordingly, the CPU 51 starts the operation from step 1000 at a predetermined time, and moves to step 1005, wherein it determines whether or not the value of the automatic-brake-operation flag CONT is "1".

Assuming that the automatic brake control is in operation and the braking operation is not in operation, the value of the automatic-brake-operation flag CONT comes to "1" by the operation of step 820. Accordingly, the CPU 51 makes a positive determination in step 1005, and moves to step 1010, wherein it determines whether or not the brake switch 42 is in off mode.

Since brake operation is not executed at the present, the CPU 51 makes a positive determination in step 1010, and moves to step 1015, wherein it gives an instruction to open only the cut valve PA1. The CPU 51 then moves to step 1020, wherein it determines whether or not the wheel-cylinder pressure Pw2 obtained from the wheel-cylinder-hydraulic-pressure sensor 45-2 is equal to or higher than the specified hydraulic pressure Pwa.

Here, when the target pressure difference ΔPt determined in step 910 is equal to or larger than the specified hydraulic pressure Pwa, the wheel-cylinder pressure Pw2 is equal to or higher than the specified hydraulic pressure Pwa. Accordingly, the CPU 51 make a positive determination in step 1020, and moves to step 1025, wherein it gives an instruction to open also the cut valve PA2. Accordingly, both of the cut valves PA1 and PA2 come in open position.

On the other hand, when the target pressure difference ΔPt determined in step 910 is smaller than the specified hydraulic pressure Pwa, the wheel-cylinder pressure Pw2 is also smaller than the specified hydraulic pressure Pwa. Accordingly, the CPU 51 make a negative determination in step 1020, and moves to step 1030, wherein it gives an instruction to close only the cut valve PA2. Accordingly, only the cut valve PA1 comes in open position.

Thereafter, the CPU 51 repeats steps 1005 to 1015 as long as the automatic brake operation continues (CONT=1) and the braking operation is not in operation. As a result, when the wheel-cylinder pressure Pw2 is equal to or larger than the specified hydraulic pressure Pwa, both of the cut valves PA1 and PA2 come to open position; when the wheel-cylinder pressure Pw2 is smaller than the specified hydraulic pressure Pwa, only the cut valve PA1 comes to open position The case where brake operation is executed in this state (i.e., a brake override is executed) will be described. In this case, the CPU 51 makes a negative determination in step 1010, and moves directly to step 1095. Thereafter, the CPU 51 repeats steps 1015 and 1010 as long as the brake override is continued. As a result, the cut valves PA1 and PA2 are maintained in the state at the start of the brake override.

In other words, when the wheel-cylinder pressure Pw2 at the start of the brake override is the specified hydraulic pressure Pwa or more, both of the cut valves PA1 and PA2 are maintained in open position; when the wheel-cylinder pressure Pw2 at the start of the brake override is smaller than the specified hydraulic pressure Pwa, only the cut valve PA1 is maintained in open position. Thus, the brake feeling during the brake override is improved.

Then the case where the conditions for ending the automatic brake control with the automatic brake control in operation (CONT=1) will be described. In this case, the CPU 51, which is repeating the routine of FIG. 8, makes a positive determination in step 830, and moves to step 835, wherein it changes the value of the automatic-brake-operation flag CONT from "1" to "0".

Thus, the CPU 51 makes a positive determination in step 805, and again monitors in steps 810 and 815 whether or not the conditions for starting the automatic brake control have been met.

Thus, the CPU 51, which is repeating the routine of FIG. 9, makes a negative determination in step 905, and moves to step 920, wherein it gives an instruction to bring all the solenoid valves into a nonenergized state, and the motor MT into a nondriven state. Thus the automatic brake control is terminated.

The CPU 51, which is repeating the routine of FIG. 10, makes a negative determination in step 1005, and moves to step 1035, wherein it determines whether or not the brake switch 42 is in off mode, wherein when it makes a negative determination, the CPU 51 moves directly to step 1095, wherein it ends the routine for the present.

On the other hand, when the brake switch 42 is in off position (i.e., no braking operation is executed, so that the master-cylinder pressure Pm is "0"), the CPU 51 makes a positive determination in step 1035, and moves to step 1040, wherein it gives an instruction to close the cut valves PA1 and PA2. In other words, even when the conditions for ending the automatic brake control have been met, an instruction to close the cut valves PA1 and PA2 is not given during the brake-pedal operation.

This ensures that the cut valves PA1 and PA2 are closed when the capacity of the reservoirs RA1 and RA2 comes to the minimum value (e.g., "0"), thus ensuring that the maximum brake fluid for the reservoirs RA1 and RA2 are sucked into the reservoirs RA1 and RA2 when the subsequent automatic brake control is started and a brake override is performed. Thus, a brake feeling with little wrongness can be provided with stability during a brake override.

As has been described above, the automatic brake control unit according to the first embodiment of the invention can be applied to an automatic braking device including the reservoirs RA1 and RA2 that can suck the brake fluid discharged from the master cylinder MC, and the cut valves PA1 and PA2 that can permit or prohibit the introduction of the brake fluid into the reservoirs RA1 and RA2. With the automatic brake control unit, when the wheel-cylinder pressure Pw2 is equal to or larger than the specified hydraulic pressure Pwa with the automatic brake control (low-speed-driving following-distance control in this example) being in operation, both of the cut valves PA1 and PA2 are brought into open position; when the wheel-cylinder pressure Pw2 is smaller than the specified hydraulic pressure Pwa, only the cut valve PA1 is brought into open position; and when the brake override is started, the state of the cut valves PA1 and PA2 is maintained.

Accordingly, when the wheel-cylinder pressure Pw2 is equal to or larger than the specified hydraulic pressure Pwa with a brake override in operation, the brake fluid discharged from the master cylinder MC according to the brake-pedal stroke St is sucked into the reservoirs RA1 and RA2 by the maximum amount for the reservoirs RA1 and RA2 (corresponding to the brake-pedal stroke S2); when the wheel-cylinder pressure Pw2 is smaller than the specified hydraulic pressure Pwa, the brake fluid discharged from the master cylinder MC in correspondence with the brake-pedal stroke St is sucked into the reservoir RA1 by the maximum amount of only the reservoir RA1 (corresponding to the brake-pedal stroke S3).

Accordingly, the relationship between the brake-pedal stroke St and the wheel-cylinder pressure Pw during a brake override can be placed in the region indicated by the fine dots shown in FIG. 6. This can prevent a decrease in the wheel-cylinder pressure Pw relative to the brake-pedal stroke St as compared with that for normal brake operation, and allows the driver to have a brake feeling of little wrongness during the brake override.

The invention is not limited to the first embodiment, but various modifications may be employed within the scope of the invention. For example, while the first embodiment adopts a structure in which the closing or opening of the cut valve PA2 is determined depending on whether or not the wheel-cylinder pressure Pw2 at the start of a brake override is equal to or larger than the specified hydraulic pressure Pwa, it may be determined depending on whether or not the wheel-cylinder pressure Pw1 at the start of a brake override is equal to or larger than the specified hydraulic pressure Pwa.

While the first embodiment is constructed such that the maximum capacities of the reservoirs RA1 and RA2 are equal, they may not be equal. Thus, the region indicated by the fine dots in FIG. 6 can be adjusted more freely, allowing the driver to have a brake feeling of little wrongness during the brake override.

While the first embodiment is constructed such that the systems of the brake-override-time-brake-fluid sucking section 38 have the reservoirs (RA1 and RA2) and the solenoid valves (PA1 and PA2) system to system (refer to FIG. 2), only one of the systems may have the reservoir (RA1) and the solenoid valve (PA1).

In this case, it is preferable that the maximum capacity of the reservoir (RA1) be the total of the maximum capacities of the reservoirs RA1 and RA2 in the first embodiment. In this case, it is preferable that the capacity of the master cylinder of the system having the reservoir (RA1) be larger than that in the first embodiment.

Second Embodiment

An automatic brake control unit according to a second embodiment of the invention will be described. The automatic brake control unit is different from the first embodiment in that the static relationship between the brake-pedal stroke St and the wheel-cylinder pressure Pw for the case where a brake override is executed is brought close to that for a normal brake operation by controlling a pressure-reducing valve PD** in place of the reservoirs RA1 and RA2 and the cut valves PA1 and PA2. Accordingly such a difference will be principally described.

Figure 12:
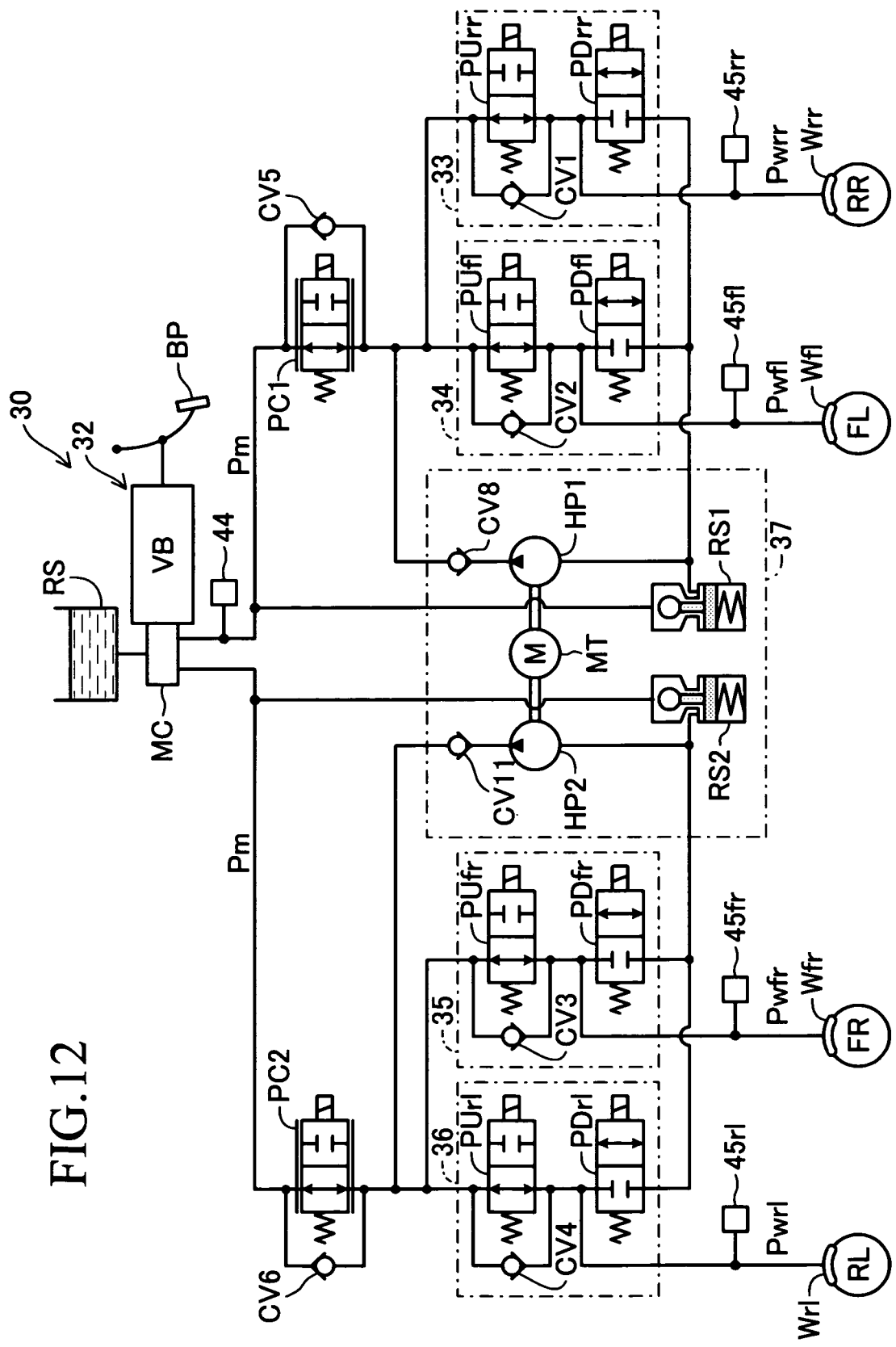
FIG. 12 is a schematic diagram of a brake-pressure controlling unit of an automatic braking device incorporating an automatic brake control unit according to a second embodiment of the invention.

FIG. 12 is a schematic diagram of a brake-pressure control unit 30 of an automatic braking device 10 incorporating the automatic brake control unit according to the second embodiment. The automatic braking device 10 is different from the automatic braking device 10 shown in FIGS. 1 and 2 only in that the brake-override-time-brake-fluid sucking section 38 and the wheel-cylinder-hydraulic-pressure sensors 45-1 and 45-2 are omitted; wheel-cylinder-hydraulic-pressure sensors 45 that detect the wheel-cylinder pressures Pw of the wheels individually are added; and a brake-pedal stroke sensor 46 (a stroke obtaining section, refer to FIG. 1) that detects the brake-pedal stroke St is added.

Actual Operation of Second Embodiment

The actual operation of the automatic brake control unit according to the second embodiment will be described. A CPU 51 of this unit executes the routine of the CPU 51 of the first embodiment, shown in FIGS. 7 to 9, and executes the routine of the flowchart shown in FIG. 13 in place of the routine shown in FIG. 10. The routine specific to the second embodiment, shown in FIG. 13, will be described.

Figure 13:
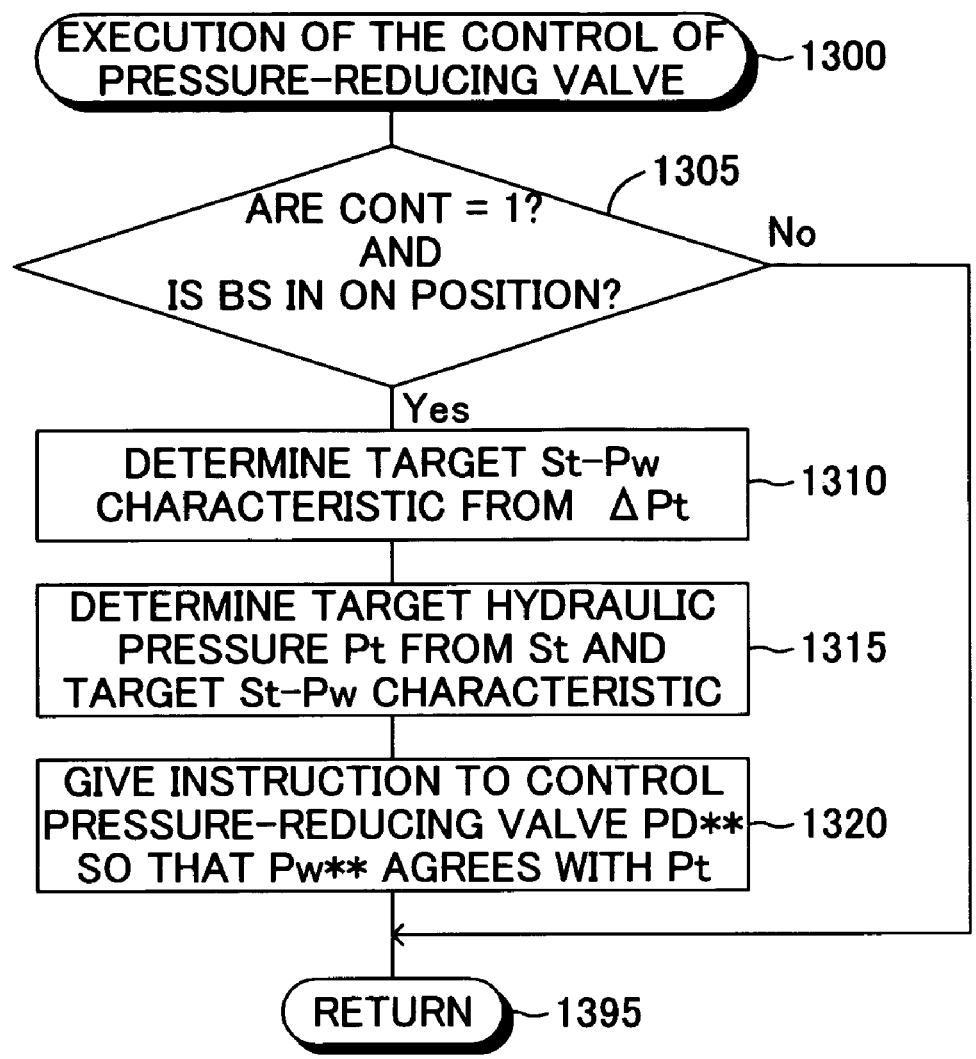
FIG. 13 is a flowchart of the routine for controlling the pressure-reducing valve by the CPU of the automatic brake control unit according to the second embodiment.

The CPU 51 repeatedly executes the routine of controlling the pressure-reducing valve PD**, shown in FIG. 13, at a fixed interval (e.g., 6 msec). Execution of the routine of FIG. 13 provides the function of the specific-operation executing section.

Accordingly, the CPU 51 starts the operation from step 1300 at a predetermined time, and moves to step 1305, wherein it determines whether or not the value of the automatic-brake-operation flag CONT is "1" and the brake switch 42 is in on-position (i.e., whether a brake override is in operation), wherein when it makes a negative determination, it moves directly to step 1395, and ends the routine for the present.

Assuming that a brake override is in operation, the CPU 51 makes a positive determination in step 1305, and moves to step 1310, wherein it determines a target "brake-pedal-stroke-wheel-cylinder-pressure characteristic" (target St-Pw characteristic) from the target pressure difference ΔPt set in step 910 of FIG. 9.

As the target St-Pw characteristic, for example, the target St-Pw characteristic during a brake override, which is obtained in the first embodiment, shown in FIG. 6, is used. Specifically, for example, when the target pressure difference ΔPt is set to the value PwC, the target St-Pw characteristic is set to the characteristic indicated by the broken line B of FIG. 6; when the target pressure difference ΔPt is set to the value PwH, the target St-Pw characteristic is set to the characteristic indicated by the alternate short and long dashed line C of FIG. 6; and when the target pressure difference ΔPt is set to the value PwL, the target St-Pw characteristic is set to the characteristic indicated by the chain double dashed line D of FIG. 6.

Thus, the target St-Pw characteristic is determined on the basis of the target St-Pw characteristic for the case where at least a normal brake operation is in operation so as to come close to the target St-Pw characteristic for the normal brake operation indicated by the solid line A of FIG. 6. The step 1310 corresponds to a target determination section.

Subsequently, the CPU 51 moves to step 1315, wherein it determines the target hydraulic pressure Pt from the brake-pedal stroke St that is given from the brake-pedal stroke sensor 46 at the moment and the determined target St-Pw characteristic.

The CPU 51 moves to step 1320, wherein it gives an instruction to control the opening and closing to the pressure-reducing valve PD so that the wheel-cylinder pressures Pw agree with the determined target hydraulic pressure Pt, and moves to step 1395, wherein it ends the routine by the present. Thereafter, the CPU 51 makes a positive determination in step 1305 as long as the brake override is being executed, and as a result, the control of the pressure-reducing valve PD** is continued.

Accordingly, in the case where the target pressure difference ΔPt is set to the value PwC as an example, when the control of the pressure-reducing valve PD is not executed (the pressure-reducing valve PD is maintained in close position), the St-Pw characteristic during the brake override is the characteristic indicated by the broken line B of FIG. 4; when the control of the pressure-reducing valve PD** is executed (in the case of the second embodiment), the St-Pw characteristic during the brake override is the characteristic indicated by the broken line B of FIG. 6. That is, also the second embodiment can provide a brake feeling with little wrongness during the brake override, as with the first embodiment.

What is claimed is:

1. An automatic brake control unit for use in an automatic braking device comprising:

a hydraulic circuit connecting a master-cylinder and a wheel-cylinder;

a pressurizing section for generating pressurizing hydraulic pressure used for generating a wheel-cylinder pressure in the wheel-cylinder higher than a master-cylinder pressure generated by the master-cylinder according to the operation of a brake operating member by a driver;

a pressure-control section, intervened in the hydraulic circuit, for controlling the amount of pressurization added to the master-cylinder pressure by using the pressurizing hydraulic pressure generated by the pressurizing section; and an automatic brake control section for supplying, as the wheel-cylinder pressure, a hydraulic pressure obtained by adding the amount of the pressurization to the master-cylinder pressure directly to the wheel cylinder via the hydraulic circuit, and for executing automatic brake control for automatically controlling the wheel-cylinder pressure while the brake operating member is not being operated by the driver, by controlling the pressurizing section and the pressure-control section to control the amount of the pressurization to be greater than zero; wherein the automatic brake control unit comprises:

a specific-operation executing section for starting a specific operation when the brake operating member starts to be operated by the driver in a state in which the automatic brake control has already been started by the automatic brake control section, the specific operation bringing the relationship between the operation stroke of the brake operating member by the driver and the wheel-cylinder pressure in a case where the automatic brake control is being executed and the brake operating member is being operated by the driver to the relationship between the operation stroke of the brake operating member by the driver and the wheel-cylinder pressure in a case where the automatic brake control is not being executed and the brake operating member is being operated by the driver.

2. The automatic brake control unit according to claim 1, wherein
the automatic braking device further includes:
a reservoir that can suck a brake fluid discharged from a master cylinder and having the master-cylinder pressure; and
a solenoid valve that can permit or prohibit the introduction of the brake fluid having the master-cylinder pressure into the reservoir; and
the specific-operation executing section controls the solenoid valve so that, when the automatic brake control is not executed, the introduction of the brake fluid having the master-cylinder pressure into the reservoir is prohibited; and when the automatic brake control is executed, the introduction of the brake fluid into the reservoir is permitted as the specific operation.

3. The automatic brake control unit according to claim 2, wherein
the reservoir includes a hydraulic-pressure control mechanism that increases the brake pressure in the reservoir with an increase in the amount of the brake fluid sucked into the reservoir.

4. The automatic brake control unit according to claim 3, wherein
the hydraulic-pressure control mechanism is constructed using the elastic force of an elastic member that receives a force corresponding to the brake pressure in the reservoir.

5. The automatic brake control unit according to claim 2, wherein
the automatic braking device includes a two-system brake hydraulic circuit including two systems each having the reservoir and the solenoid valve;
when the automatic brake control is not in operation, the specific-operation executing section controls the solenoid valves of the two systems individually so as to prohibit the introduction of the brake fluid having the master-cylinder pressure into the corresponding reservoir; and
when the automatic brake control is in operation, the specific-operation executing section always controls one of the solenoid valves so as to permit the introduction of the brake fluid having the master-cylinder pressure into the corresponding reservoir and controls the other of the solenoid valves so as to permit the introduction of the brake fluid into the corresponding reservoir only in the case where the wheel-cylinder pressure at the start of the operation of the brake operating member by the driver has exceeded a specified pressure higher than the atmospheric pressure.

6. The automatic brake control unit according to claim 1, wherein
the automatic braking device further includes:
a pressure-reducing valve for controlling the wheel-cylinder pressure to a pressure lower than that obtained by adding the amount of pressurization to the master-cylinder pressure;
a stroke obtaining section that obtains the operation stroke of the brake operating member by the driver; and
a target determination section that determines the target of the relationship between the operation stroke of the brake operating member by the driver and the wheel-cylinder pressure when the automatic brake control is in operation on the basis of at least the relationship between the operation stroke of the brake operating member and the wheel-cylinder pressure when the automatic brake control is not in operation; and
when the automatic brake control is in operation and the brake operating member is in operation by the driver, the specific-operation executing section determines the target value of the wheel-cylinder pressure from the obtained operation stroke and the determined target relationship, and controls the pressure-reducing valve, as the specific operation, so that the wheel-cylinder pressure agrees with the target value.

7. A medium for recording an automatic brake control program for use in an automatic braking device comprising:
a hydraulic circuit connecting a master-cylinder and a wheel-cylinder;
a pressurizing section for generating pressurizing hydraulic pressure used for generating a wheel-cylinder pressure in the wheel-cylinder higher than a master-cylinder pressure generated by the master-cylinder according to the operation of a brake operating member by a driver;
a pressure-control section, intervened in the hydraulic circuit, for controlling the amount of pressurization added to the master-cylinder pressure by using the pressurizing hydraulic pressure generated by the pressurizing section; wherein
the automatic brake control program includes:
an automatic brake control step of supplying, as the wheel-cylinder pressure, a hydraulic pressure obtained by adding the amount of the pressurization to the master-cylinder pressure directly to the wheel cylinder via the hydraulic circuit, and of executing automatic brake control for automatically controlling the wheel-cylinder pressure while the brake operating member is not being operated by the driver, by controlling the pressurizing section and the pressure-control section to control the amount of the pressurization to be greater than zero; and
a specific-operation executing step of starting a specific operation when the brake operating member starts to be operated by the driver in a state in which the automatic brake control has already been started by the automatic brake control step, the specific operation bringing the relationship between the operation stroke of the brake operating member by the driver and the wheel-cylinder pressure in a case where the automatic brake control is being executed and the brake operating member is being operated by the driver to the relationship between the operation stroke of the brake operating member by the driver and the wheel-cylinder pressure in a case where the automatic brake control is not being executed and the brake operating member is being operated by the driver.

* * * * *